US007287009B1

(12) United States Patent
Liebermann

(10) Patent No.: US 7,287,009 B1
(45) Date of Patent: Oct. 23, 2007

(54) SYSTEM AND A METHOD FOR CARRYING OUT PERSONAL AND BUSINESS TRANSACTIONS

(76) Inventor: Raanan Liebermann, 79 Bayard Ave., North Haven, CT (US) 06473

( * ) Notice: Subject to any disclaimer, the term of this patent is extended or adjusted under 35 U.S.C. 154(b) by 1399 days.

(21) Appl. No.: 09/662,451

(22) Filed: Sep. 14, 2000

(51) Int. Cl.
*G06Q 40/00* (2006.01)
(52) U.S. Cl. .......................... 705/42; 705/35; 705/39; 705/43; 705/44
(58) Field of Classification Search ................ 705/35, 705/39, 42, 43, 44
See application file for complete search history.

(56) References Cited

U.S. PATENT DOCUMENTS

| | | | |
|---|---|---|---|
| 4,878,239 A | 10/1989 | Solomon et al. | |
| 4,972,461 A | 11/1990 | Brown et al. | |
| 5,058,152 A | 10/1991 | Solomon et al. | |
| 5,177,780 A | 1/1993 | Kasper et al. | |
| 5,301,226 A | 4/1994 | Olson et al. | |
| 5,450,476 A | 9/1995 | D'Apuzzo et al. | |
| 5,513,250 A | 4/1996 | McAllister | |
| 5,661,781 A | 8/1997 | DeJager | |
| 5,675,507 A | 10/1997 | Bobo, II | |
| 5,731,575 A * | 3/1998 | Zingher et al. | ............. 235/379 |
| 5,761,271 A | 6/1998 | Karnowski | |
| 5,764,747 A | 6/1998 | Yue et al. | |
| 5,870,723 A * | 2/1999 | Pare et al. | ..................... 705/39 |
| 5,883,810 A * | 3/1999 | Franklin et al. | ............ 700/232 |
| 5,889,839 A | 3/1999 | Beyda et al. | |
| 5,946,386 A * | 8/1999 | Rogers et al. | ......... 379/265.09 |
| 6,366,682 B1 * | 4/2002 | Hoffman et al. | ............ 382/115 |
| 6,768,788 B1 * | 7/2004 | Langseth et al. | .......... 379/67.1 |

* cited by examiner

*Primary Examiner*—Alain L. Bashore
(74) *Attorney, Agent, or Firm*—Bachman & LaPointe

(57) ABSTRACT

The present invention relates to a system and a method for carrying out personal transactions including financial transactions, e-mail transactions, and voice messaging transactions. A user of the system is issued a ten digit identification number in the form of a telephone number. The identification number may be the user's actual phone number or a pseudo phone number. The user is also assigned a PIN number which contains a single or multiple digit security element which allows the user to indicate a security problem and its nature by dialing the assigned PIN number and which allows the user to avoid tripping the security elements of the system by using a digit or digits other than that/those assigned as the significantly placed digit(s) in the PIN number. Access to the system is provided either by dialing a central telephone number or via the Internet.

31 Claims, 15 Drawing Sheets

SYSTEM AND A METHOD FOR CARRYING OUT PERSONAL AND BUSINESS TRANSACTIONS

BACKGROUND OF THE INVENTION

The present invention relates to an improved system and method for carrying out personal and business transactions, such as financial transactions, e-mail transactions, and voice messaging transactions. The system and method of the present invention may be utilized by hearing individuals as well as hearing impaired or deaf individuals.

Communication plays an increasingly growing role in today's society. Despite dramatic technological changes in the past years, the telephone continues to be a principal means of communication. A growing number of people have cell phones and routinely use them to leave voice messages for friends and associates and conduct business transactions. Sometimes however the telephone number of the individual or business that they are trying to contact is not readily available.

Over the years, messaging systems have been developed which allow a user to leave messages for subscribers to the messaging system. U.S. Pat. No. 5,450,476 to D'Apuzzo et al., for example, illustrates a nonpublished number messaging system which allows a caller to leave a message for a party having an unpublished telephone number. In this system, calls to a directory assistance operator are routed to a voice mail service provider. A recorded message left by the caller is delivered to the appropriate party by the provider.

U.S. Pat. No. 5,661,781 to DeJager illustrates a message notification system in which subscribers are automatically notified of newly arrived messages in their mailboxes when they initiate a transaction, such as a calling card call or a withdrawal at an ATM. The mail arrival notification message is delivered to the subscriber as part of the validation process for the credit/debit or calling card number.

U.S. Pat. No. 5,675,507 to Bobo II illustrates a message storage and delivery system which is connected to a plurality of DID phone lines. The system is designed to receive facsimile messages, voice messages, and data messages. The system assigns a separate telephone number to each user and is capable of receiving more than one message simultaneously for a single user. The messages are stored in a memory and converted into HTML files. The system is connected to the Internet and notifies the users with an e-mail message each time a message is received. The system is also capable of paging a user upon receipt of a message. After receiving notification, the user can download the message onto his/her computer or simply preview the message. A user can also telephone the system to listen to messages.

U.S. Pat. No. 4,878,239 to Solomon et al. describes a method and an apparatus for establishing anonymous telephone communications between service subscribers and responding callers over public telephone lines. Incoming calls from callers are transferred by a system controller and an additional subsystem to a message recording facility or directly to the desired subscriber.

U.S. Pat. No. 5,767,747 to Yue et al. relates to a personal number communications system which assigns a personal number to each subscriber and receives from each subscriber communication routing information in the form of one or more hierarchical lists of destinations based on the time of day and day of the week. The system receives communications directed to the subscriber's personal number and identifies the source of the communication. The system then selects a first destination for the communication from the hierarchical list. At the first destination, the system announces the identified source of the communication and requests disposition information as to the acceptance, formal rejection or passive rejection, such as a no answer, of the communication. If rejected, the system routes the communication to the default destination selected by the subscriber. If there is a passive rejection, the system requests communication disposition information from the next destination in the destination list according to the hierarchy selected by the subscriber. The system continues to request communication disposition information from each sequential destination on the destination list until the communication is accepted or until the last destination on the destination list is reached, at which point the communication is routed to the last destination.

Other voice mail and message delivery systems are shown in U.S. Pat. Nos. 5,301,226 to Olson et al., 5,058,152 to Solomon et al., 5,889,839 to Beyda et al., 4,972,461 to Brown et al., 5,761,271 to Karnowski, and 5,177,780 to Kasper et al.

Telephones are also being used in connection with credit card transactions. For example, U.S. Pat. No. 5,513,250 to McAllister illustrates a system and a method for enhancing the security of credit card use through a telephone system wherein the subscriber may establish through the telephone network a series of parameters which must be satisfied in order to activate the credit card to permit validation by passage of the card through the conventional point-of-sale magnetic swiping device. The parameters may include subscriber establishment of an activation time frame, an activation area, a dollar limit on purchasing power, a temporary PIN valid subject to satisfaction of the other parameters, and voice verification.

Despite these systems, there still is a need for a secure system and method for carrying out financial transactions which also allows a user to leave voice messages and e-mails for others. There is also a need for a system and method for carrying out personal and/or business transactions which leaves a verifiable trail to the identity of the transaction originator. Still further, there is a need for an improved communication system for hearing impaired/deaf persons.

SUMMARY OF THE INVENTION

Accordingly, it is an object of the present invention to provide a secure system and method for carrying out personal transactions including financial, e-mail, and voice messaging transactions.

It is another object of the present invention to provide a system and method as above which enables the utilization of a universal, personal or individual, open market identification coupled with a unique secure transaction identifier.

It is a further object of the present invention to provide a system and method as above which utilizes a PIN number having a security component which uniquely indicates trail activation requirements, as well as, the well being of the user.

It is yet a further object of the present invention to provide a system and a method as above which allows a wide variety of financial transactions to be carried out at a wide variety of locations.

It is still a further object of the present invention to provide a system and a method as above which allows users to purchase merchandise over the Internet without having to use and/or expose credit/debit cards.

It is still another object of the present invention to provide a system and a method as above which allows individuals or entities to purchase merchandise over the Internet even though they do not have a credit card.

It is still another object of the present invention to provide a system and a method which allows hearing impaired or deaf people to leave emails and voice messages for others.

It is still another object of the present invention to provide a system and a method which allows hearing impaired or deaf individuals to participate in conference calls with others.

The foregoing objects are attained by the system of the present invention.

As used herein, the term "on-line service provider" means any service provider including but not limited to on-line service providers or independent service providers (ISPs).

In accordance with the present invention, a system for carrying out personal transactions including financial transactions, e-mail transactions, and voice messaging transactions is provided. A user of the system is issued a ten digit identification number in the form of a telephone number. The identification number may be the user's actual phone number or a pseudo phone number, which pseudo phone number is linkable to the user's actual phone number. The user is also assigned a PIN number which contains a single or multiple digit security element which allows the user to indicate a security problem by dialing the assigned PIN number and which allows the user to avoid tripping the security elements of the system by using one or more digit(s) other than those assigned as the security digit(s) in the PIN number.

The system of the present invention allows a user to perform a wide variety of financial transactions including deposits, withdrawals, merchandise purchases, etc. at a wide variety of locations. It also allows a user to purchase merchandise over the Internet without using a debit/credit card.

The system of the present invention allows a user, including a deaf person, to transmit and receive e-mails and to be notified when he/she is a recipient of such e-mails. The system also allows a user to send money to another party and to notify a recipient that money is available and allows the recipient to receive or retrieve the available money. The system enables a user to receive e-mails and/or money notification without actually having a personal computer.

The system of the present invention also allows a user to receive voice messages from both subscribers and non-subscribers to the system. For example, an individual using a pay phone or a cellular phone may leave a message for another party, without utilizing that party's answering machine, which can be retrieved by the another party from another pay phone or another cellular phone.

The system of the present invention also allows hearing impaired or deaf people to participate in conference calls with other hearing impaired or deaf individuals and/or hearing individuals.

Methods for using the system of the present invention to accomplish the foregoing are also described.

Other details of the method and system of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

As previously mentioned, the present invention relates to a method and a system for carrying out various types of personal transactions using an identification number in the form of a telephone number. The system may include one or more communication centers 10 whose structure will be described hereinafter. Each of the centers 10 is configured to perform financial, e-mail, and voice messaging transactions as well as other types of personal transactions.

One of the transactions that can be carried out using the method and system of the present invention is called Fast Cash Transaction (FCT). FCT is a monetary system that allows a user to move money, either in the form of real cash or virtual cash, in a number of ways. Virtual cash, as used herein, is cash moved among temporary or non-temporary accounts called Cash On Line Accounts (COLA). The FCT system cures the problems that present day sundry banking and monetary transactions of cash payments and receipts are lacking—namely automation, security, and privacy. Further, the FCT system cures the current problem that most monetary transactions are not "at will" and require customers to be in specific locations at specific times.

Utilizing the FCT portion of the system of the present invention, a user can go to any retail establishment, such as a chain food store or gasoline station, deposit cash under a set format of transactions and request delivery of the cash to a particular third party or to himself. The third party can then go to another retail establishment and redeem the designated amount in cash. The FCT system also allows a user to obtain cash, that had been deposited in another location by a third party, from an automated teller machine (ATM). A user can also keep a certain amount of cash in a private COLA and simply issue instructions about movement of the cash in the account via telephone. If the recipient of the cash being moved has a COLA account, then the amount of money transferred can be credited to his/her COLA account. The recipient could also receive the money being transferred at an ATM, a kiosk, an FCT terminal, or a retail location without having a standing account relationship. The FCT system can also be used to electronically pay bills in the form of e-mail notices, such as mortgage payments via e-mail. It is a more cost-effective approach than dedicated web sites run by individual goods/services providers.

As will be described in more detail hereinafter, utilizing the FCT system, a user can tag a transaction without revealing such tagging if money is being extracted under duress. Alternatively, the user can alert a 911 emergency station via a silent embedded 911 call if a potential violent occurrence is related to the withdrawal. The alarm is automatically activated by a default with each transaction unless turned off by the user utilizing a special feature of his/her PIN number.

Figure 1:
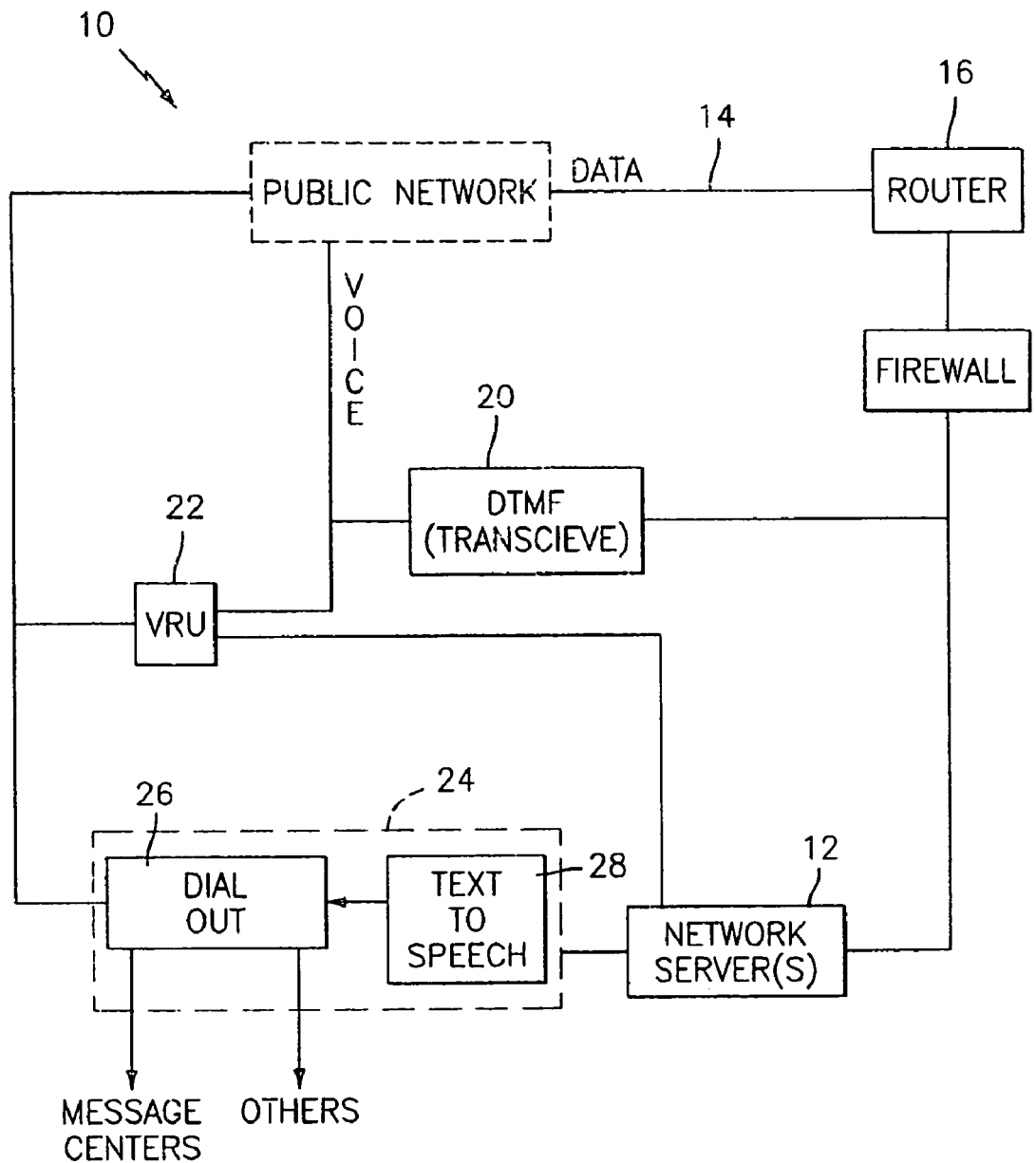
FIG. 1 is a schematic representation of a center for performing personal transactions in accordance with the present invention.

A center 10 used to perform a FCT transaction is shown in FIG. 1. The center 10 is also preferably used to support voice messaging, e-mail transaction, and other communication systems in accordance with the present invention. The center 10 includes a local area network 12 having one or more servers and a number of data bases needed to operate the center and perform the FCT, voice messaging, e-mail, and other communication transactions. Data can be received by the local area network 12 from a web site which can be accessed via the Internet through any Internet service provider via data line 14 and router 16. Data line 14 may comprise any suitable data transmission line known in the art. Similarly, router 16 may comprise any suitable router known in the art. A firewall 18 is provided to prevent unauthorized personnel, such as hackers, from gaining access to the information stored in the local area network 12. The firewall 18 may include blocking routers as well as dedicated pre-bastion and bastion systems differentiating between systems' read and write authorizations. Any suitable firewall technology known in the art may be used for the firewall 18.

The center 10 also has one or more lines for voice transmissions to allow the public to access the center via any telephone system. A point to point transport media, such as T-1, T-3, or wireless, enabling transmission between the center 10 and a telephone company (TELCO), that is further connected by the TELCO to the public network system, such as is presently done by a unit like a DMS 500, enables a large number of telephone transactions. As shown in FIG. 1, communications coming over a voice line pass through a dual tone multifrequency device (DTMF) 20 before being forwarded to the local area network 12.

The center 10 also includes a voice response unit 22. The voice response unit 22 receives voice and/or DTMF communications from the public and converts them to digital signals. The voice response unit 22 or an ancillary unit communicates the digital signals to the local area network 12 and receives digital instructions from the local area network 12 for responses to be made in response to the voice communications. In this way, necessary information from a user of the system, such as his/her identification number, can be inputted and additional information requested. For example, the voice response unit 22 can be instructed by the local area network 12 to provide the user with voice instructions, such as press 1 for e-mail, press 2 for voice messaging, press 3 for cash transactions, etc., to gain more information about the transaction to be consummated. There are a number of commercial voice response units, such as one sold by Verifone, which can be used for the voice response unit 22. It should be noted that other ways exist to accomplish this function. For example, a text to speech unit 28 can instruct the user in voice based on appropriately triggered questions submitted in text and transmitted in voice while the DTMF unit deciphers the response of the user.

The center 10 further includes a telephone communications system 24 for communicating with outside agencies such as the police, fire, other institutions such as banks, etc. While the system 24 can have any desired configuration, it preferably has a dial out unit 26 and a text to speech unit 28. When performing voice messaging services, the telephone communications system 24 may be linked to sub-message centers (not shown) located around the country for reasons to be discussed hereinafter.

Access to the center 10 can be gained in a number of ways. For example, the public can access the center 10 using any standard telephone and any desired telephone service. As discussed above, telephone communications travel along the voice line to the dual tone multiple frequency device 20 and then to the local area network 12. Alternatively, the center 10 may be accessed via the Internet. Data entered in this manner moves along the line 14 and through router 16 to the local area network 12. Accessing the center 10 in a wireless manner is similar to voice travelling along a voice line except that the airways replace the land line transport media.

Figure 2:
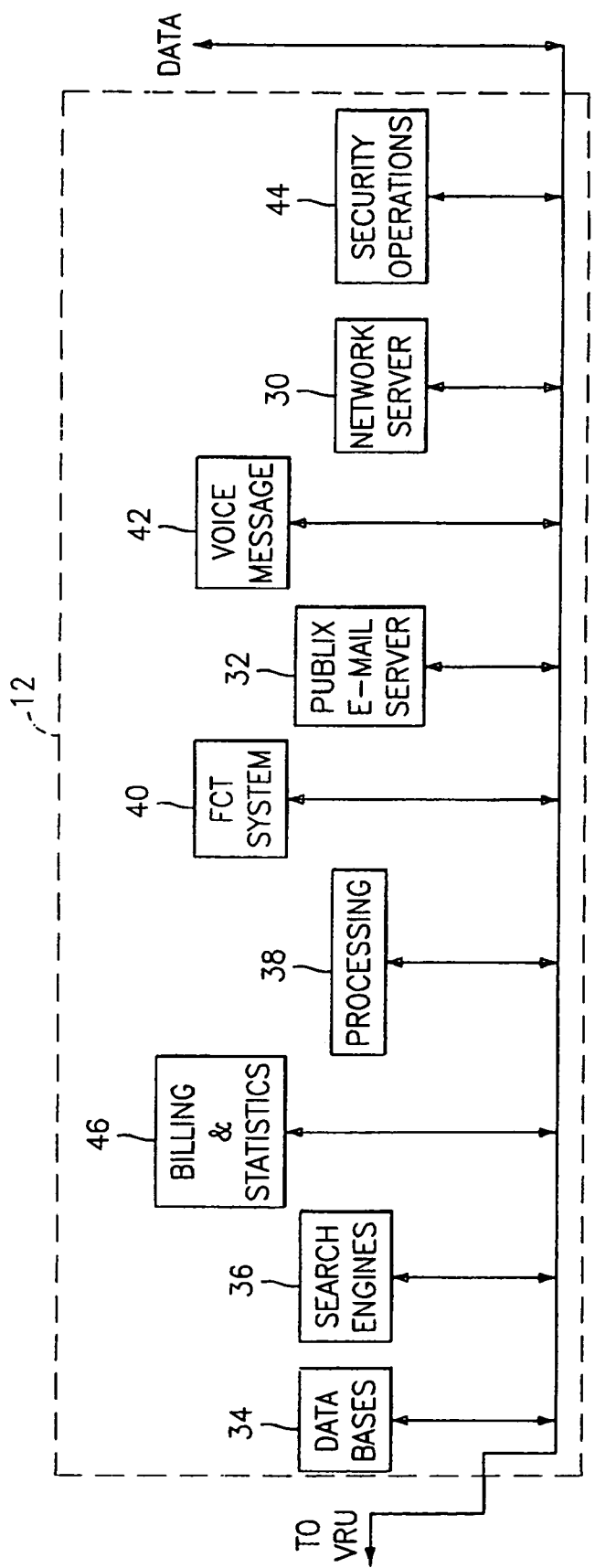
FIG. 2 is a schematic representation of a local area computer network used in the center of FIG. 1.

The local area network 12 can have any desired architecture. FIG. 2 schematically shows one such architecture where the local area network 12 includes a server 30 for operating the network and a server 32 dedicated to operating the e-mail function. Other servers can be added for specific applications that are independent though related conceptually. The local area network 12 also includes a number of data bases 34 including, but not limited to, a historical data base, a maintenance data base, a customer data base, a billing and collection data base, a statistical data base, an administrative data base, a transactions data base, a data base for holding messages, and a retained message database. The data bases can be combined as appropriate and may be stored in any suitable storage device known in the art using any suitable storage media.

The local area network 12 further includes a search engine 36 with access to the data bases 34; a set 38 of stored processing instructions which govern the operation and has access to the servers 30 and 32; a server 40 having a set of stored FCT operating instructions to which the server 30 has access; a server 42 having a set of stored voice messaging system operating instructions to which the server 30 has access; a security operation and data base 44 to which each of the servers 30, 32, 40 and 42 have access; and a billing and statistics data base 46 which can be accessed by the servers 30, 32, 40 and/or 42 and to which any of the servers can transfer information.

The security system 44 contains instructions for checking both static and dynamic system states as well as an appropriate data base. For example, when checking static system states, the instructions when implemented by one of the servers in the network 12 checks for: (1) multiple account numbers with the same pin number; (2) multiple pin numbers with same or different account numbers; (3) transactions involving similar amounts, days, and/or time of day; (4) frequent transactions involving a particular user; and (5) the relationship of the transaction originator to an account. From this information pattern calculations and variations can be made and elevated states determined. If an elevated state is determined, an alert to the system can be issued. When checking dynamic states, the data base looks at geographic transactions, frequency of usage, and/or sums and patterns. From these checks, pattern and magnitude variation calculations are made using standard mathematical techniques and from these calculations, elevated states are detected. As before, alerts can be issued to the system when an elevated state is detected.

Each of the servers 30, 32, 40, and/or 42 used in the local area network 12 may comprise any suitable computer known in the art programmed using any suitable program in any suitable language known in the art and any suitable operating system. For example, each server could be a Tandem computer, an uninterruptable Stratus computer, a Hewlett-Packard computer, or an IBM compatible computer. The programming used with the computers should preferably be multi-user, multi-tasking software. Still further, the operating system for each server can be any operating system known in the art, such as Windows NT or a UNIX version.

As discussed above, the center 10 preferably includes a publicly accessible Internet web site for the downloading of free software, client's software, and upgrades, such as those needed to perform FCT transactions, as well as service, Q&A sessions, and general users activity. The web site preferably is operated by its own server (not shown). Preferably, the hardware platform used for the Internet web site is not a node on the local area network at the center 10 and is free standing so as to provide a shield between public access and network operations. A dedicated hardware platform processes all Public Internet transactions and is shielded from the rest of the FCT systems by fire wall architecture 18.

Figure 3:
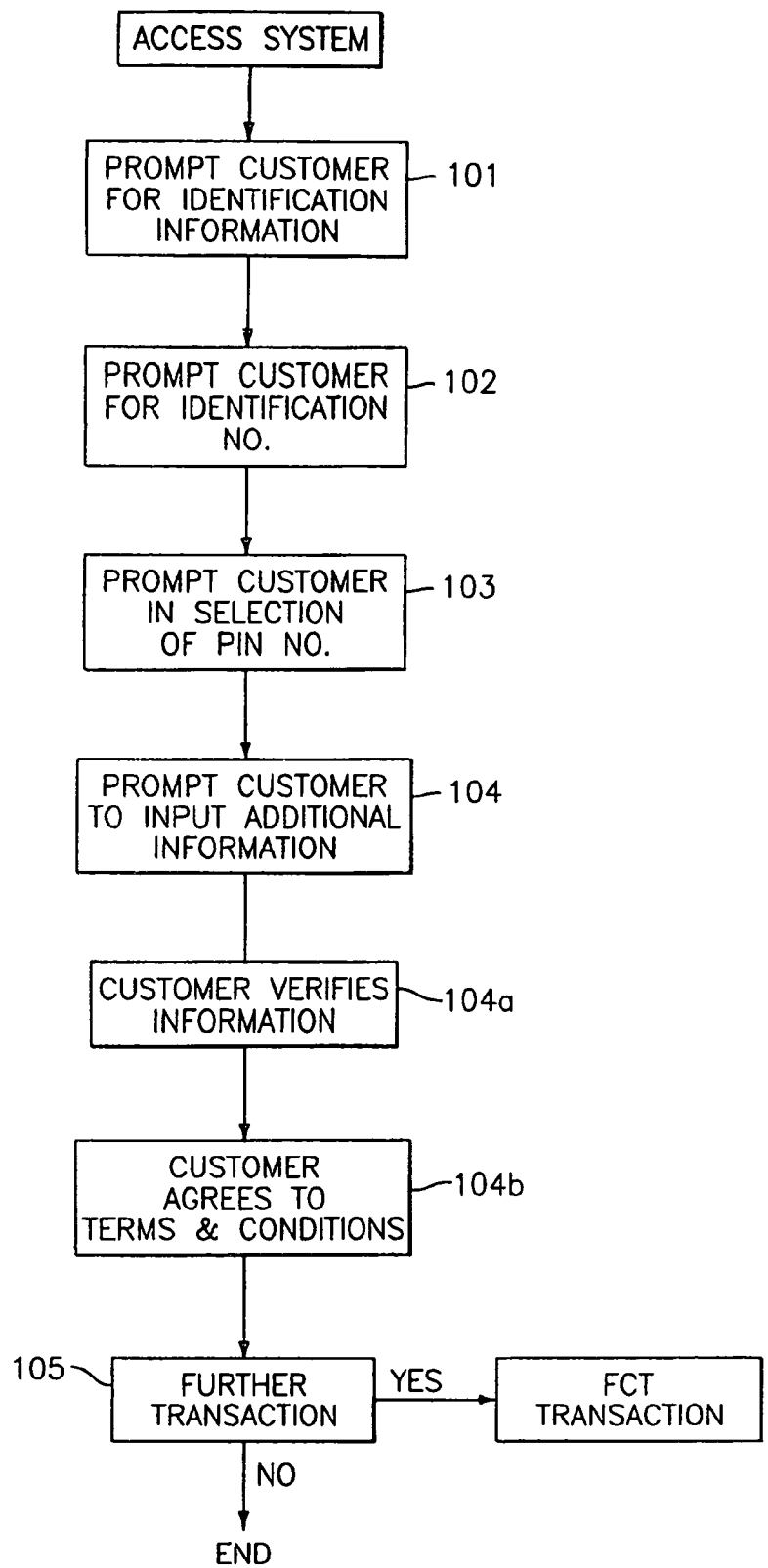
FIG. 3 is a flow chart illustrating the opening of an account for performing financial transactions using the system of the present invention.

FIG. 3 is a flow chart illustrating the process for a customer to register with and/or open an account with the FCT system operated by the center 10. The customer can use any telephone to open an account in a relatively short amount of time by accessing the FCT system via a central telephone number such as an 800 number. Alternatively, the customer can use his/her personal computer to access the FCT system via the Internet site operated by the center 10 or via a dedicated FCT Internet access website operated by the center 10.

When a telephone is used, the actions of the customer needed to set up the account are voice prompted by the voice response unit 22 or the text to speech complex 24. Deaf and hard of hearing customers receive their prompting in text or sign language as discussed later on. When setting up the account via the Internet, the actions of the customer needed to set up the account are prompted on the customer's monitor via instructions issued by the FCT system 40 or a FCT related server 50 when one is used.

In step 101, the customer or user is prompted to provide certain identification information. For example, the customer may be asked to provide his/her first name, middle initial, surname, home address, home telephone, business address, business telephone number, etc.

When registering and/or setting up an account, each customer is assigned a unique identification number, referred to by the FCT System as a Telephone Number Address (TNA), and a PIN number. In step 102, the customer is prompted for a ten digit identification number in the form of a telephone number. The identification number may be the customer's actual telephone number or a fictitious telephone number that he/she selects or is given by the system. If desired, a customer can request the FCT system to randomly allocate an identification number. Fictitious or pseudo identification numbers are registered with the FCT system and published in an internal FCT directory that is stored in the customer data base.

In step 103, the customer is prompted to select a PIN number. The PIN number may be one which is requested by the customer or a number which is assigned to the customer by the FCT system. The assigned PIN number is stored in the customer data base.

The PIN number is composed of two segments. The segments may be consecutive or interlaced. The first segment is a standard numeric of any number of consecutive digits broken only if it is interlaced with a component of the second segment. Each digit in the first segment can take any numerical value in the range of 0 to 9. The second segment is a single or multiple digit security element. Each digit in the second segment can take any numerical value in the range of 0 to 9. The two segments may be concatenated or interlaced to form a single PIN representation. The security element is a security device for both monetary value transacted as well as the transacting parties. The FCT system and method are designed so that under normal transaction conditions, without any threat to money or persons, the security digit(s) given by the customer may be any digit(s) except the digit(s) selected by the customer for the security digit(s). Under adverse conditions, the security digit(s) in the PIN used by the customer are the numerical value(s) selected for the security digit(s). If the customer uses the selected value(s) for the security digit(s), then the FCT system sends an alarm signal to appropriate authorities via the telephone communication unit 24 at the center 10. The alarm signal triggers elements that identify the location of the customer or parties under duress.

When the customer selects two digits for the second or security segment, a first one of the digits, when used, would signify an adverse condition but not one which involves bodily harm to the customer, while the second one of the digits, when used, would signify an adverse condition which involves potential bodily harm to the customer.

The PIN number may have any desired number of digits. In a preferred embodiment of the present invention, the PIN number has five digits with the fifth digit in the string being the security digit; however, other combinations may be used to render similar results, such as the fourth, or any other, digit in a four digit PIN number being the security digit. If desired, one of the digits in the first segment of the PIN may specify the location of the second security segment. In step 103, the customer selects a plurality of numbers to form the first segment and one or two single digit numbers to form the second segment. As previously mentioned, the customer can select a digit in the first segment to indicate which digit in the PIN forms the second segment.

As can be seen from the foregoing description, the PIN number used by the customer in the FCT system provides improved user security.

In step 104, the customer may be prompted to provide additional information. For example, a customer may be requested to input a credit/debit card number against which system charges can be debited. In step 104*a*, the customer verifies all information. In step 104*b*, the customer agrees to the terms and conditions under which the FCT system operates. The customer also agrees to sign a hard copy of same.

In step 105, the customer can close the registration or account opening session either by hanging up his telephone or logging off the FCT website. Alternatively, the customer can commence an FCT transaction such as depositing funds into his/her newly opened account or withdraw funds that were already deposited in his/her account after activation by registering as shown in FIG. 3.

To assist in carrying out certain FCT transactions, each customer can be issued an FCT card containing his/her identification information and account number on a magnetic strip, or whatever technology the debit/credit card industry is using at the time, and a signature line. The card can look like an ordinary credit card. If desired, the card can also contain a picture of the customer.

Figure 4:
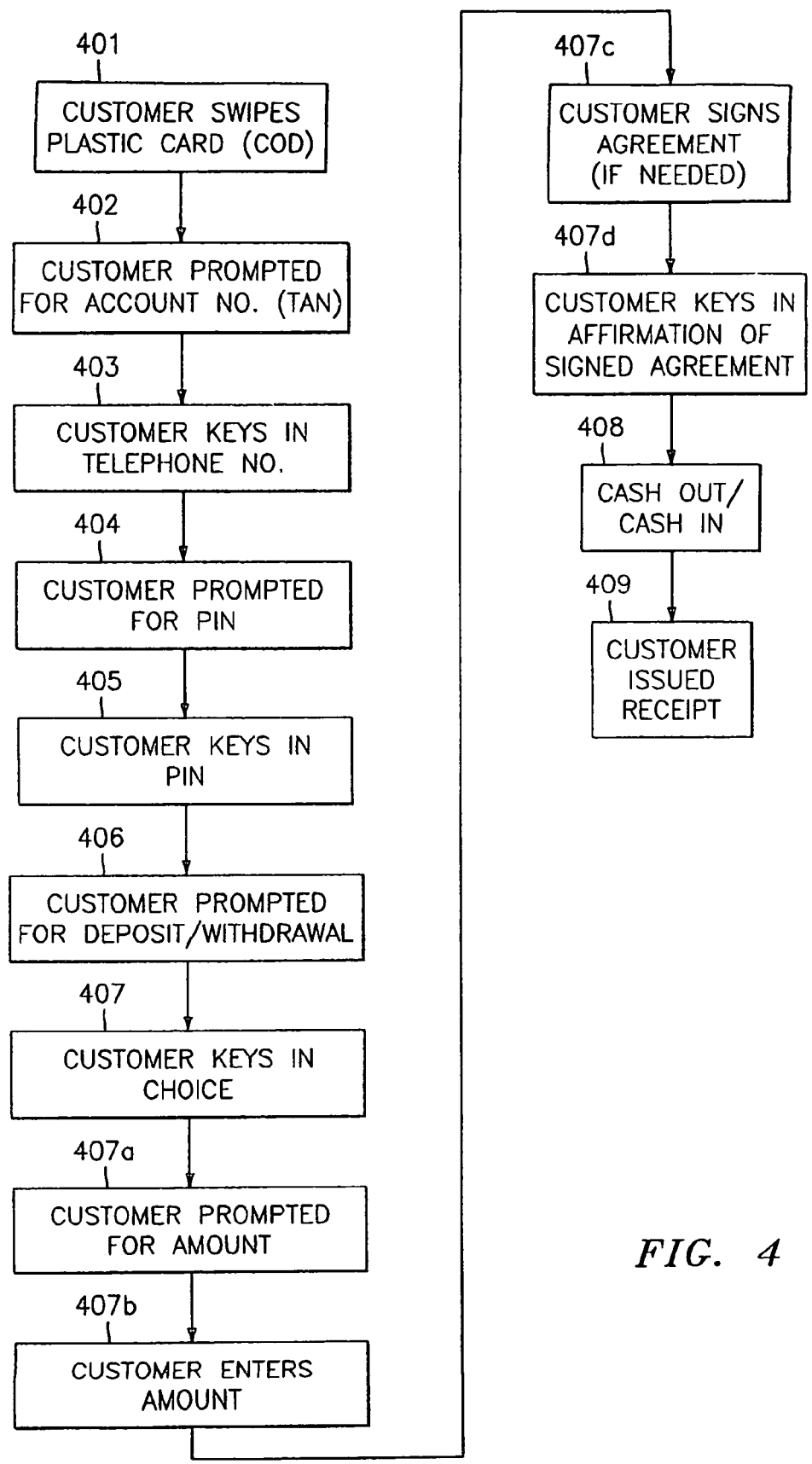
FIG. 4 is a flow chart illustrating the making of a deposit or withdrawal at a remote location using the system of the present invention.

FIG. 4 is a flow chart illustrating in schematic form the manner in which a customer can make a deposit into, or a withdrawal from, his/her account using a point of sale terminal at a store, an outlet, etc., connecting the information to the FCT center 10. In step 401, the customer goes to any desired location having a point of sale terminal that can be connected to the FCT center 10 and swipes an FCT card, which is also known as a card on demand (COD). In step 402, the customer responds to the prompt on the terminal asking for the customer's account number. In response to this prompt, in step 403, the customer keys in his/her telephone number being used as his/her identification number. This is done by using the key pad on the terminal. The customer in step 404 is then prompted for his/her PIN number. In step 405, the customer enters his/her PIN number without tripping the FCT security system as discussed above. In step 406, the customer is prompted to press "1" for a deposit or "2" for a withdrawal and the amount of money to be deposited or withdrawn. In step 407, the customer keys in the choice. In step 407*a*, the customer is prompted for the amount (deposit/withdrawal) and keys in the desired amount in step 407*b*. If the customer has not yet signed a written agreement if required, then he/she does it at the counter (step 407*c*) and, in step 407*d*, keys in an affirmative response to any question about such signature. The written agreement may be a standard banking account agreement. In step 408, the operator of the retail store or outlet, who acts as an agent for the FCT system, pays money to the customer if the transaction is a withdrawal or receives money from the customer if the transaction is a deposit. Obviously, if the transaction is a withdrawal, the customer has previously deposited monies into his/her account or such funds were deposited on his/her behalf. If the withdrawal requests exceeds the combined FCT transaction fee and the amount of money in the customer's account, the local area network 12 will issue instructions to cancel the transaction or to modify the transaction. In step 409, the point of sale terminal issues a receipt identifying the transaction. For a deposit, the receipt is for the purchase of virtual cash vouchers. On cashing out, the receipt is for a refund of the virtual cash vouchers.

Figure 5:
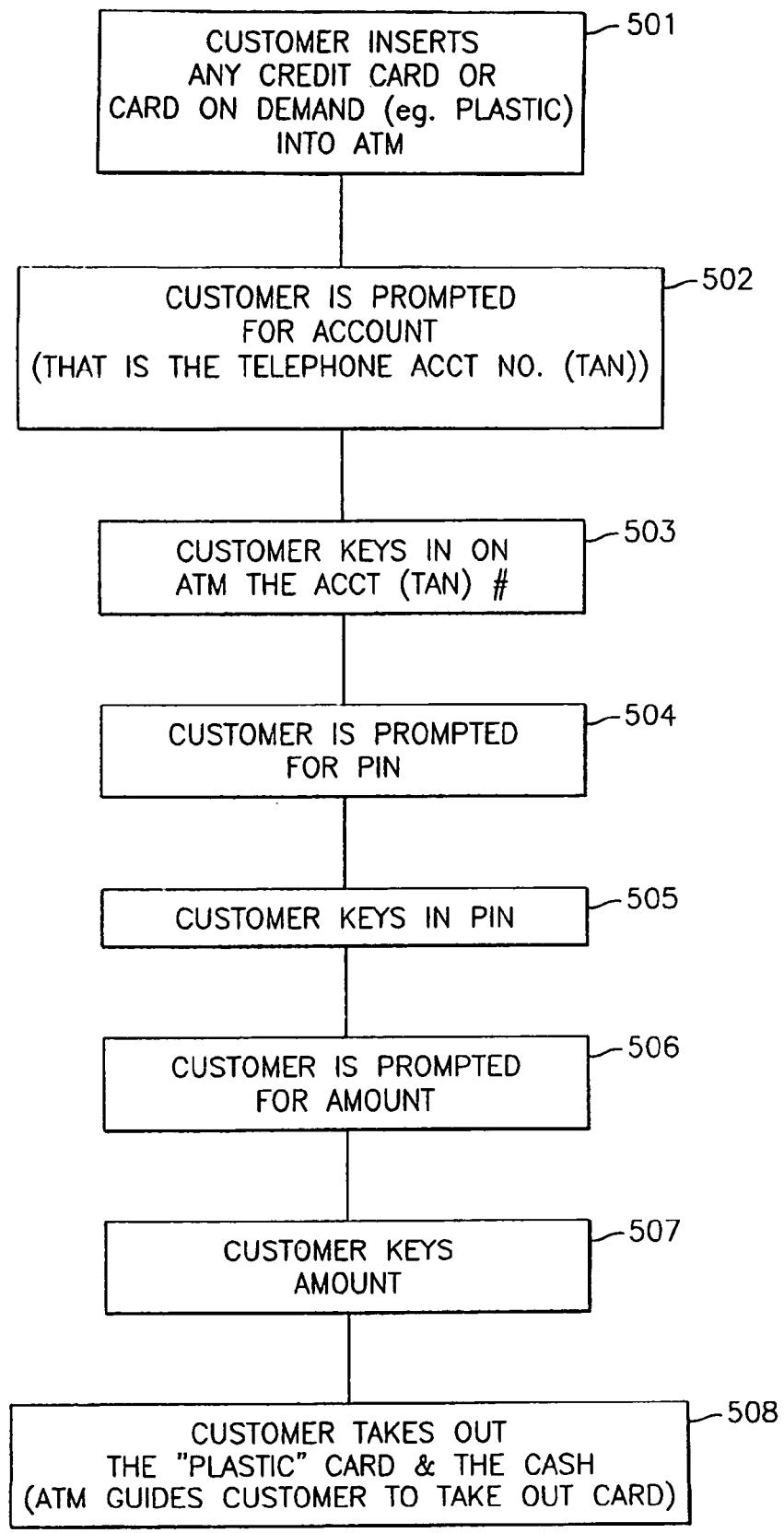
FIG. 5 is a flow chart illustrating an ATM transaction withdrawing money using the system of the present invention.

FIG. 5 illustrates a transaction carried out by a customer at an ATM. As shown therein, in step 501, the customer inserts any credit card or a COD card into the ATM. In step 502, the customer is prompted for account information, that is the telephone identification number (TNA) for his/her account. In step 503, the customer keys in his/her identification number using the key pad on the ATM machine. In step 504, the customer is prompted for his/her PIN number. In step 505, the customer keys in his/her PIN number either in a way which does not trip the FCT security system or in a way which does trip the FCT security system if the transaction is being made under duress. In step 506, the customer is prompted for the dollar amount of the transaction, i.e. money to be withdrawn from his/her account. In step 507, the customer keys in the dollar amount. As before the FCT system verifies that the customer has the requested amount of cash and required transaction fees in his/her account. If the customer does not have sufficient cash in his/her account, then either the transaction is cancelled or the customer is prompted to modify the transaction to a lesser amount. In step 508, the customer takes his/her credit card or the COD card out of the machine along with any cash being dispensed.

As can be seen from the descriptions of FIGS. 4 and 5, the FCT system and method makes cash deposits and withdrawals much easier to transact. It also provides the convenience of allowing the customer to carry out such transactions at a wide range of stores, outlets, non-banking institutions, and ATM machines. It allows an unrelated third party to deposit an amount on behalf of a customer at a geographically remote location and the customer can withdraw such amounts at another geographically placed ATM or a point of sale (POS) station.

Figure 6:
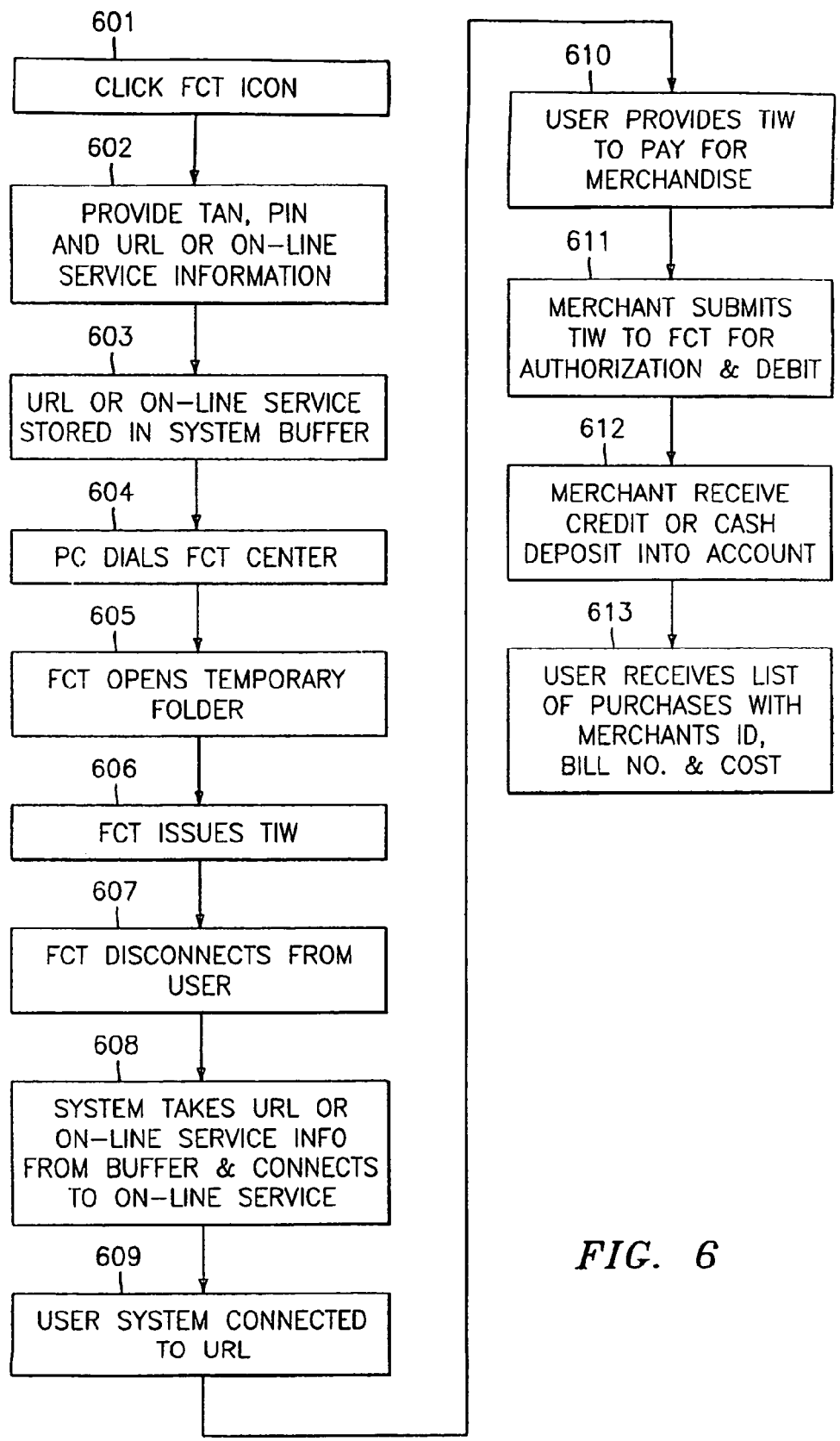
FIG. 6 is a flow chart illustrating the purchase of merchandise from a retailer using the system of the present invention.

FIG. 6 illustrates a FCT transaction where a customer is purchasing merchandise. As shown in step 601, the transaction may be initiated using a terminal, such as a POS terminal with connectivity to the local area network 12 or by using a personal computer. Using either device, the user first clicks on a FCT transaction icon if displayed on the screen associated with the terminal or computer or swipes a card. Transactions may also be accomplished in a similar manner by utilizing a POS or a standard phone or in certain instances an ATM machine with the customer responding to prompts by the system.

In step 602, the customer is prompted by the FCT system to enter his/her identification number and his/her PIN number. The user has the option to store these numbers in the system so that the system can automatically use this information and dispense with the need for prompts. Thereafter, the customer is prompted to enter transactional information including the URL or on-line service provider enabling access to the retailer at which merchandise is purchased on line and also including if desired a dollar limit for the transaction. The customer can also indicate a desire for shipping or delivery of goods or services without revealing to the seller, customer identity and/or address. In step 603, the information which the customer has entered including the URL or on-line service dial-up number or the retailer dial-up number is stored in a buffer located in the computer associated with the terminal or in the personal computer being used by the customer.

In step 604, the computer associated with the terminal or the customer's computer dials up the FCT center 10. After the information downloaded to the FCT center 10 has been stored in a buffer, the FCT programming used by the network 12 opens a temporary folder. This is shown in step 605. As shown in step 606, the FCT program issues a transaction identification number known as a transaction in waiting or TIW. Preferably, the TIW contains sixteen digits. The details of the structure of the TiW will be discussed hereinafter. The TIW is communicated to the computer being used by the customer and is stored in the buffer containing the information of the transaction to be consummated. The TIW may or may not be known to the customer. In a preferred approach to the FCT system, the TIW is not known to the customer even though it is resident in his/her computer.

In step 607, the FCT center 10 disconnects from the user. In step 608, the FCT center 10 connects to a computer utilized by the retailer such as the computer used to control the retailer's point of sale terminals or the retailer's transactions or alternatively routes the customer call to the URL or on-line service previously specified by the customer and held in buffer 603. The FCT center 10 either then, or upon request by the retailer, downloads to the retailer's computer, the details of the forthcoming transaction including the TIW number assigned to same. Alternatively, the FCT center 10 downloads only pertinent TIW information enabling the customer to purchase on-line.

In step 609, the customer connects to the retailer's web site either directly or via the on-line service provider. The customer then selects the merchandise to be purchased, such as books, CDs, etc., using the retailer's website. When it comes to paying the retailer, as shown in step 610, the consumer downloads the TIW from his computer by using a predetermined keystroke or set of keystrokes. If desired, the retailer's computer may be set up to ask the customer for his/her identification and PIN numbers to further verify that it is the customer purchasing the merchandise. In step 611, the retailer's computer transmits the downloaded TIW number to the FCT center 10 for transaction authorization and for debiting the customer's account. In step 612, if the retailer has an account with the FCT center, the account is credited with the amount of the transaction. If the retailer does not have an FCT account, then the computer network 12 initiates payment to the retailer in an alternative manner, e.g. issuing a check to the retailer or partaking in the electronic settlement of the National Automated Clearing House Association (NACHA). In step 613, the customer is provided with a list of his/her purchases with the retailer's identification number, a bill number, and an indication of the total cost to be debited to his/her account.

In addition to facilitating the buying of merchandise, the FCT system can be used to transfer funds from one individual to another. Such a transaction is similar to that carried out to buy merchandise. To initiate such a transaction, the customer accesses the FCT system and enters his/her identification and PIN numbers, the amount to be transferred, the intended recipient's FCT identification number (pseudo or real), the name of the person to whom the money is being transferred, and the type of transaction, i.e. standard or non-standard. To provide the name of the person to whom the money is being transferred, the letters on the number pad of a telephone or a computer keyboard may be used to spell the first name and the first four letters of the last name of the recipient. After receiving the instructions from the customer, the FCT system opens a TIW for the transaction and keeps the TIW and the customer's identification number and PIN number within the local area network 12. A number, which is preferably unknown to the customer, is assigned to the TIW by the FCT system. As before, the TIW represents a temporary account that automatically closes when the value in the account is depleted. The individual to whom the money has been transferred can withdraw the money as desired by accessing the FCT system. If desired, the money could be cashed out of any ATM or a participating merchant's POS.

One of the advantages to the FCT system is that no transaction in the FCT system occurs without a TIW being open and no transaction is completed successfully without properly closing the TIW. The TIW contains all the historic information related to the transaction, as well as the needed handshakes for it to be completed successfully. The TIW may have any desired byte length, for example 136 bytes. The bytes in the TIW describe the transaction. Table I illustrates a typical TIW.

TABLE I

| Byte Number | Byte Group Name | Remarks/Function |
| --- | --- | --- |
| 1-12 | Time Stamp | Time module. Part of case ID |
| 13-20 | Group Serial Number | Identify order within a time module |
| 21 | Entrance Byte | |
| 22 | Personal Security | |
| 23 | Business Security | |
| 24 | Escalation Byte | |
| 25-44 | Customer's TAN | |
| 45-49 | PIN | |
| 50-69 | Secondary TAN | When transacting for someone else |
| 70 | TIW Locator Matching | |
| 71-86 | Monetary Sum | Five decimal digits are allocated for |
| 87-111 | Target TAN | |
| 112 | Transaction Byte | |
| 113 | FCTE Byte | |
| 114 | Other Transactions | |
| 115 | Router Bookkeeping | |
| 116 | Router Verification | |
| 117 | Security Byte | |
| 118 | Security Activation | |
| 119 | Fees Byte | |
| 120-130 | CID Bytes | |
| 131-136 | Date of Birth | |

Since all withdrawals from an FCT temporary account are electronic, it is not possible to take out more money than is in the temporary account.

If the transaction being carried out by the customer is a transfer from one account to another, the FCT system makes the transfer electronically. This is done by debiting the customer's account and placing monies into a temporary account. Following the instructions given by the customer, the FCT system then moves the money in the temporary account to the account of the third party or recipient. This is done using standard banking techniques for transferring funds from one account to another. After the transaction has been completed, the customer may receive a printed receipt recording the particulars of the transaction.

As can be seen from the foregoing description, the FCT system provides wide versatility in making financial transactions. Customers have access to cash anytime, anywhere. Further, the system makes transactions easy since they can be done by ordinary telephone systems. As a result, customers do not even have to leave home to make financial transactions, even those which include the receipt of cash.

The FCT also allows customers to interact with the Internet marketplace. Using their personal computers, which have been programmed with FCT software (client software), customers can browse the Internet and visit vendors' sites. They can purchase goods using their FCT account in lieu of a credit card, without even disclosing their FCT account number on-line. Any purchase made by the customer using the FCT account would be honored so long as the customer has sufficient funds to cover the cost of the article and any applicable fees. Customers can fund their FCT account from home in a variety of manners including credit cards or debit cards utilizing the phone, or through financial transactions utilizing a computer and a bank or credit union account. Customers can also fund their FCT account via the FCT account of a third party or from a point of sale station.

The FCT system can be used by a wide variety of customers for a wide variety of purposes. For example, it could be used by customers in a casino to obtain cash. It could be used by customers who do not qualify for regular credit cards. Vacationers can use the system in lieu of traveler's checks. The system could be used by those who suddenly need to post bail or need to pay unexpected fines. The system could be used by those who want to use a 900 number, either without a trace to their telephone bill, or a pay phone, or a cellular phone. The system could also be used to buy lottery tickets from home. In essence, the system can be used to keep cash in cyberspace that is available day and night in cash form rather than in a traditional bank account.

An FCT business transaction is similar to an individual transaction with one major difference. While a business TNA and PIN are used as in the individual case, access to the business transaction is only through an individual access. That is an individual needs to enter using his/her own personal TNA and PIN in order to gain access to enter the business TNA and PIN. Thus the system always has a "fingerprint" of what individual performed a transaction for the business. Likewise, individual A can transact for individual B when individual B entrusts to individual A both individual's TNA and PIN; however, individual A needs first to identify himself/herself for the system by entering individual A's TNA and PIN number. While it may appear that individual A once armed with both the TNA and PIN of individual B can by-pass the individual entry with his/her own TNA and PIN, the system is capable of detecting idiosyncratic differences between individual A and B and can sound an alarm.

An adjunct to the FCT system being operated by the communication center 10 is an addressless public e-mail network system known as Publix Network system. In this system, a person can send money to a mailbox of an intended recipient who will be notified when money is in such mailbox and enable retrieval of such funds, whether the recipient has or does not have a computer and an active on-line service access. Using the Publix Network system, it does not matter what on-line or ISP vendor is being utilized by the sender and the recipient of the e-mail. It can be the same vendor or different. The Publix Network system is designed to operate across ISP services. In the Publix Network system, the sender does not need to know the recipient's e-mail address to initiate a mailing. Similarly, sending a fax or paging a party is easily done without the need to know the recipient's fax number or pager and PIN number.

Publix Network is a paradigm which is based on utilizing the recipient's telephone number as the address, which telephone number is the same TNA used in the FCT system. The Publix Network system insures that the message is securely received only by the intended party, even if several parties are using the same telephone number. In this paradigm, the telephone number of the recipient, which needs to be unique, does not need to be a real functioning telephone number and can be a pseudo telephone number chosen by the recipient or by the automated number allocator of the Publix Network system.

E-mail sent to an office address (i.e. telephone number) can easily be directed, either by sender or recipient, for delivery at a home e-mail address or be available to the recipient at both home and office addresses. Likewise, sending the e-mail to a home telephone address could be directed to either home, business, or both addresses by either the sender or recipient. Hence, a sender does not need to know the work place of the recipient, or its e-mail address if the home one is known. Conversely, if the work place number is known, the home number does not need to be known. Furthermore, should an e-mail recipient change employers, mail directed to his or her old address at the previous employer will be available to him or her at the new employer's address without a need to advise the sender about such change, as long as the e-mail is personal.

The Publix Network service utilized by individual e-mail users or businesses, can either be offered to on-line and ISPs as a resource, and/or be utilized independently by the user community.

The Publix Network operation will accord the following added services: (1) notify the e-mail recipient of pending mail arrival while it is still en-route to him or her and irrespective of how long it will take to arrive at the recipient's final address destination; (2) notify the recipient of incoming mail and/or its arrival without the need to have his or her computer connected to the on-line service or the ISP being utilized; and (3) provide the ability to listen on a standard telephone to the content of the e-mail before, as well as after, it arrives at the recipient address.

In operation, each user of the Publix Network system is first registered with the center 10 as a designated e-mail user. This enables one to send cash to an e-mail box and likewise retrieve the cash from an e-mail box. The user is assigned an identification number which is in the form of a ten digit telephone number (TNA). As previously stated, the telephone number may be an actual telephone number or a pseudo telephone number. Each user is also assigned a PIN number which contains the aforementioned first and second segments with the second segment providing a security alert feature.

As shown in FIG. 2, the Publix Network system is operated by a dedicated server 32. The server 32 preferably has three search engines available to it. The first search engine, the personal ID search engine, identifies a user by searching for his/her TNA and retrieving his/her file. The user, besides being an individual, could be a company, an agency, etc. The second engine is a reverse personal ID directory which is a reverse directory. The user specifies the non Publix e-mail address of an addressee and obtains the Publix e-mail address for the addressee. The third search engine is a company search directory which enables a user to key in the acronym of a company's name and find out the descriptor appropriate for the company. When using the company search directory, the user does not need to stay on line to do the search. Rather, the Publix Network system can download to the user's system the complete block of descriptors relevant to the specified company name upon the next on-line connection to the Publix Network system. The user can scroll and decide about the pertinent descriptor off line.

A registered user of the Publix Network system has three options to access electronic mail sent to him/her. They are the traditional personal computer, a telephone for voice delivery of the e-mail, and an independent postal electronic box (PEB). The PEBs may have three configurations—lowest, medium, or full configuration. The lowest PEB configuration contains only an LED which flashes when e-mail is waiting for the user. The medium PEB configuration contains, in addition to the lowest configuration, minimal memory and an LCD through which the user can read a list of the parties who have sent mail without retrieving any of the mail. The full configuration PEB contains, in addition to the medium configuration, an enlarged memory so that messages can automatically be downloaded upon arrival at the Publix Network. The configuration also has an option of a larger LCD display to enable reading mail waiting directly of the PEB. The full configuration PEB can interface to a computer and/or a television set in order to enable reading of mail waiting in the PEB.

The Publix Network system may be enabled to provide a personal safety monitoring service which upon user's request, monitors and ascertains that user's personal safety has not been compromised. The user specifies an activation time, locations for monitoring purposes, and assistance preferences. The Publix Network system then calls the user at the location(s) specified from the time specified at certain intervals. The user needs to respond with his/her assigned PIN number to indicate to the Publix Network system that all is well. Failure to satisfy the PIN number, and any other elements specified by the user, triggers after a specified time a third party intervention to assist the user. In a preferred method of operation, the Publix Network system calls the user's specified number several times at preset intervals with random time sub segmentation. The number of times the Publix Network system calls is random but no less than three times. The Publix Network system calls the user even if the PIN number given in previous calls by the user is correct.

As indicated hereinbefore, to participate in the Publix Network system, the user, which can be either an individual or a business, must register with the system.

The Publix Network system is operated so that the e-mail data is transient and is discarded when one of the following conditions is met: (1) after a designated time period if there is no request by a customer for a longer than standard hold; (2) the customer retrieved the data either actively or passively via a download to a PEB; (3) customer utilized hear mail option; (4) e-mail was forwarded and reached final on-line or ISP destination; (5) special service for keeping data was requested and time is up; and (6) the user ceased being a Publix Network customer and the courtesy retainage time is up.

The transaction form for Publix Network operations is the Transaction-In-Process (TIP) form. In other words, no transaction takes place without a TIP being opened and no transaction can be completed without the TIP being closed. The TIP contains all of the historic information relating to a transaction as well as the needed handshakes for it to be completed successfully. The TIP is formed by a number of bytes, such as 160 bytes inclusive of the CID. Table II gives the meanings for an exemplary byte group.

TABLE II

| Byte Number | Byte Group Name | Remarks/Function |
|---|---|---|
| 1-12 | Time Stamp | Time module. Part of case ID |
| 13-19 | Group Serial Number | Identify order within a time module |
| 20 | Entrance Byte | |
| 21 | Media Byte | |
| 22 | Device Destination Byte | |
| 23 | Data Destination Byte | |
| 24-43 | Customer's TNA | |
| 44-48 | PIN | |
| 49-71 | Sender's Return Address | |
| 72 | Publix Procedural Activities | |
| 73-87 | Field C and D in IAS | |
| 88-112 | Secondary OAS | |
| 113 | Transaction Byte | |
| 114 | Public phone card Byte | |
| 115 | Completion Pending Procedures | |
| 116 | Router Bookkeeping | |
| 117 | Router Verification | |
| 118 | Static Security State | |
| 119 | Dynamic Security State | |
| 120 | Security Activation | |
| 121 | Administrative Procedure | |
| 122-136 | CID Bytes | |
| 131-136 | Date of Birth | |
| 137-160 | Primary OAS | The outgoing address segment |

The Publix Network system may utilize any suitable set of algorithms for a fast, scalable and reliable search engine. The search process is divided into three parts: (1) internal tokenizing of the incoming address; (2) searching a record via the telephone number address (TNA) and (3) identifying the specific individuals targeted by the address utilizing the additional identification (AID) provided by the sender.

There are numerous advantages to the Publix Network system. First, it can be used with recognized and standard e-mail formats, e.g. ns@company.com. Second, it can be used with a specific user ID that is easily recognized internationally and may be obtained currently from established telephone carriers by dialing information. The Publix Network system has the flexibility to be used with old or current e-mail addresses. Still further, the same ID can be used with e-mail address for the home, a person's business or both. The Publix Network system has the ability to broadcast mailing to a group of users sharing the same e-mail address and the ability to differentiate specific users, for receipt of mail, from among a group sharing the same e-mail address. The Publix Network system is a robust system that can identify specific users even if part of the user's e-mail address containing their ID is erroneous. The Publix Network system has the ability to use the same e-mail address for fax dispatch and/or for paging a party and/or wireless phone. The Publix Network system has the ability to arrange personalized or closed chat room activity with a specifically predesignated person at a mutually convenient time to all parties. The Publix Network system also has the aforementioned safety feature which allows the system to monitor the well being of the setting user or any third party designated by the user. The Publix Network system has the ability to notify e-mail recipients of mail received for them even if the receiving party has no personal computer or any other facilities except a standard telephone. The Publix Network system allows a customer or user to call in and receive a voice read-out of e-mail sent to the user and provides the ability to notify pending e-mail recipients regarding e-mail in transmit to them without the need to hook up to the Internet or the need to start a personal computer. The Publix Network system also allows a recipient of e-mail, who receives the content by phone, to respond in voice, enabling the e-mail sending party to receive such response. The Publix Network system has the capability to automatically download mail to a user's electronic mail box. The system provides the ability to identify senders and the subjects of e-mails and for PEB holders even before downloads and without being connected to the Internet or without a PC. This is a particular advantage because it allows the user to screen out e-mail that is unsolicited advertising, graphics, or attachments.

The software operation of the Publix Network system is divided as follows. The analysis segment (Segment A) which is of the "Type" in the e-mail address undergoes an analysis to determine the range of services required by the sender. The search engine locates the particular recipient's record and enables one to add to the range of services for which the user has signed up. The application software is composed of three major elements: (1) the Master Operating Procedure (MOP); (2) the MOP Set Up Procedure (MSP); and (3) the Dynamic MOP Procedure (DMP). The MOP procedure contains all the needed information for actions to deliver the required service before and during the operation, and the historic data regarding the specific services rendered after the transaction has been completed. The MSP populates the MOP action bytes for specific operations. This is basically a toggle switch operation for the specific bits in various bytes, resulting in a decimal equivalent that contains the operational requirements. The DMP causes action. This software segment visits with each of the action bytes in the MOP and collects the decimal byte equivalent which it transports to the Action Table generating the service activity.

The following is the typical transaction flow for a specific e-mail piece received at the Publix system. The e-mail address, e.g. ns@publix.net is confirmed to the sending unit as acceptable for reception. The envelope and body of the e-mail is received. The e-mail address is divided into three segments—the type, the telephone number address (TNA) and the auxiliary address segment. Multiple processing occurs. The TNA is used by the search engine to fetch recipient's record. The auxiliary address segment is analyzed by the processing unit based on input from the record. The type is analyzed for services to be rendered. Services indicated by the recipient's record are added to the list generated by the analysis of the Type. MOP set up procedure takes place according to the list generated in the previous two steps. The dynamic MOP procedure goes into effect and attends to each and every byte in the properly populated MOP. Activation of action procedures ensues based on the results of the Dynamic MOP procedure. The completed MOP is filed in the case data base. Third party data base connectivity is activated to the completed MOP.

Another adjunct to the personal transaction system of the present invention is a message center that operates within the environment of the communication center 10 and that is able to link messages stored on line with the ID of a debit or credit card so as to enable a purchasing retail customer who pays with a debit or charge card to be informed at the POS terminal that a message awaits him/her and which he/she can listen to simply by using the closest public telephone. Thus, the debit or charge card is transformed into an individual paging system that is not restricted by location and distance and is useful on a national and international level.

The message center is operated by the network server 30 having access to the FCT and Publix e-mail servers and the voice messaging instructional database or by a voice messaging server 42. The message center is a combination of the following mail and telecommunication facilities done electronically via a single media, the telephone: mail box, answering service, paging service, call forwarding, locator, telegram, and telephoning. The message center enables any individual or entity to dial a central telephone number associated with the center 10 and deposit a voice message. The sender of the message identifies himself/herself to the system via a TNA and then proceeds to identify the intended recipient by the recipient's TNA. The addressee of the voice message can retrieve the message from any touch tone telephone. The addressee is alerted of pending messages when he calls the centralized number, or when reaching his home or office, when automatically his phone rings and upon pick up the message alert will be given. Alternatively, when shopping at a store with a POS terminal, a consumer will be alerted about pending messages whenever he/she uses his/her debit or credit charge card. The message center 42 does not require the depositor of the voice message or its addressee to be pre-registered or have pre-assigned IDs. A user could use the message center to leave him/her a wake-up call or to send timed personalized messages.

Using the message center, a user could be assigned an instantaneous temporary voice box for the duration of the life of the message.

When a communication is received by the message center, it is divided into two parts—a signal part and a message part. The signal part gives addressor and addressee information and is transmitted via the touch tone keys of a telephone. The message part is transmitted via voice using the mouth piece of the telephone. The signal part is routed to the local area network 12 and the message part is routed to a storage device and stored on computer magnetic media. This enables short time multi-track on-line storage of simultaneous calls before moving to the long time storage which is kept until a purging criterion is met. The message storage is functionally the physical layout of the relational data base governed by its directory. All searches for addressees, the locations of their data, and the data objectives, are done at the system level. At the storage level, only deposition, retrieval, and erasure take place, when the appropriate media (magnetic or other) is positioned at a beginning marker and rotates to an ending marker as per system instruction.

If desired, there may be a number of sub-message centers located around the country so as to provide local access to customers. Messages received at one sub-message center can be transferred to another sub-message center as needed. The message information to be transferred (which consists only of the ID with the transfer byte and not the content of the message) contains a block of ID messages grouped together sequentially, and transferred as a packet. The packet transfer can be an independent transfer whereby only the packet is electronically shipped from sub-message center to sub-message center or a tag along transfer, whereby the packet is annexed to other material that is electronically shipped from one sub-message center to another sub-message center. The packet transfer is triggered by either of the following categories—a predetermined event or an unrelated transfer occurs when a communication from one sub-center to another sub-center takes place with regard to any unrelated inquiry. In the latter situation, the packet is annexed to the routed information. A predetermined event may be one of the following cases: (1) a predesignated period, i.e. every hour, at which a packet of all accumulated messages is transferred; (2) an accumulated threshold, i.e.

whenever the number of messages in a packet exceed a predetermined number, the transfer is triggered; and (3) an urgent transfer.

An addressee data base may reside at each individual message sub-center. The addressee data base contains the following information: (1) addressee's phone numbers; addressee's identifiers; addressee's debit/credit card numbers; addressee's history; the self-learning procedure of the data base; and the self implementing procedure. The self implementing procedure is needed to facilitate card paging. It requires that there be a correlation between phone numbers of potential addressees and their debit/credit card numbers. Any suitable method known in the art may be used to create the data base.

The internals of software mechanism by which a request from a user moves throughout the system and into delivery hinge on three basic elements—the operating system, the command set, and the case service procedure (CSP). The CSP is a menu list through which is transacted in order as governed by the operating system. It encompasses all elements of service rendering for each and every case handled by the system. Therefore, each case has its own CSP. Upon completion of service delivery, the CSP is archived. The components of the CSP includes the addressee's address pointer, a call processing byte, an annexed byte, a billing address byte, a billing information byte, and a CSP case number.

The operating system works as follows. A series of commands either pull information out or deposit information in one of the several data bases and/or operating tables. The procedure is taken out of a master operation procedure (MOP) which looks like the CSP but is more basic to the operation. It has all the steps needed to move among the data bases and the operating tables. The MOP directs the program steps from block to block throughout the completion of the process. Once a block in the kernel was completed, the MOP pointer is incremented by one and the next MOP instruction is taken on. There can be more than one MOP existing at one time. Their number depends on the number of cases handled by the system.

While the FCT system, the Publix system, and the voice messaging system have been shown as being operated at a single site, if desired, the systems could each be operated at different sites.

In order to provide additional security and redundancy to the personal transaction system of the present invention, more than one center 10 may be constructed and utilized for the system. Of course, each of the centers 10 would be linked to the other centers 10 for information sharing purposes.

While the center 10 has been shown as having a single web site through which users can access the FCT and Publix systems, the center 10 can have a web site for the FCT system and a different web site/access for the Publix system if desired.

Figure 7:
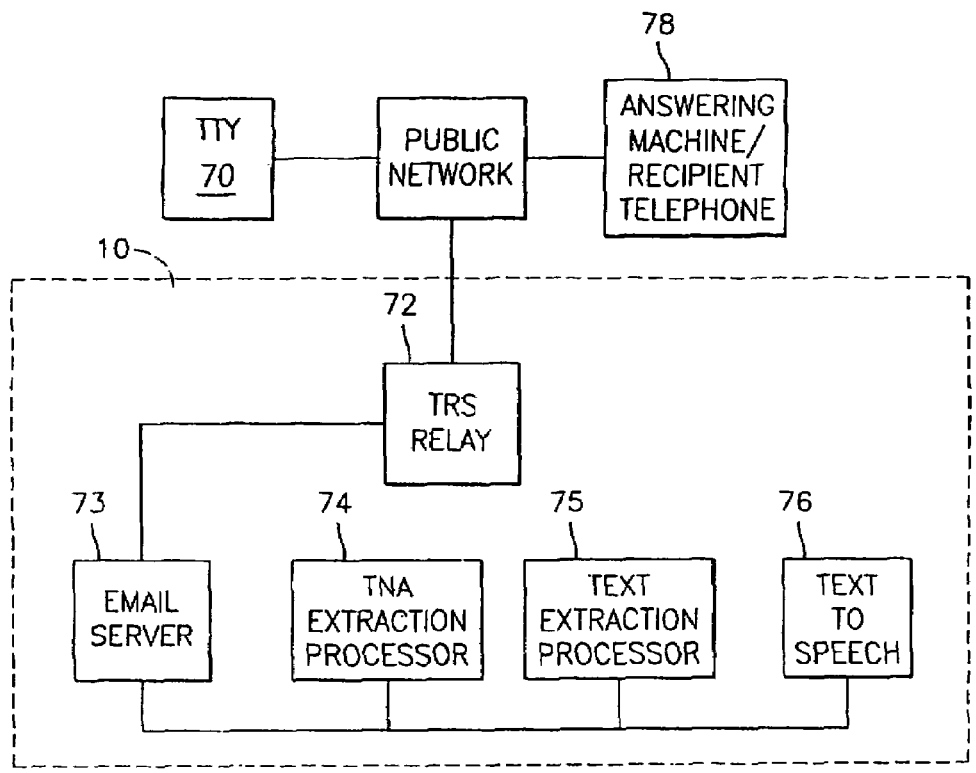
FIG. 7 is a schematic representation of a system which enables a deaf person to leave a message for another in text or voice form.

One particular advantage to the system of the present invention is that the system may be used by deaf people to leave e-mail messages or voice messages for other individuals. Referring now to FIG. 7, deaf people communicate by phone using a device 70 called a text telephone or TTY. Typically, deaf people dial a toll free number and an operator, either a human operator or a non-human device operator, assists in making calls to hearing persons, with the operator acting as an interpreter between text from the TTY and voice or as an interface to the desired service. Prior to the present invention, a deaf person using a TTY was incapable of leaving a message on a standard answering machine, such as machine 78, and was unable to send or receive e-mail. With the present invention, a deaf person using a TTY 70 can send an e-mail or a voice equivalent message using the TTY 70 as a transport device by connecting to the communication network of the present invention. To leave an e-mail, the deaf person dials a dedicated number such as an 800 number for access to the e-mail services provided by a communication center 10 in accordance with the present invention. After the center has been contacted via relay 72, a number of prompts are sent to the deaf person who responds using his/her TTY. For example, the deaf person is prompted to (1) provide the number, preferably the TNA, of the party he/she is trying to reach; (2) provide a return number or TNA for the e-mail; and (3) provide the name signature to the message. The deaf person may also be prompted to provide the e-mail address for the intended recipient if he/she knows it. The responses to the prompts provide the header to the e-mail. The header is then coded by the center 10. Thereafter, the deaf person is prompted for the text of the message. The deaf person inputs the e-mail text using his/her TTY. When the message is completed, it too is coded by the center 10. The center 10 then assigns a link number which joins the coded header to the coded message.

The e-mail message is then forwarded to the e-mail server 73 where a delivery file is opened. The e-mail is put into the queue for delivery. Processor 74 then extracts the TNA of the intended recipient and starts to dial the intended recipient using a telephone line. When the intended recipient is reached, he/she is asked to identify himself/herself and is told that there is a message from a particular person. The intended recipient is then asked if he/she would like to have the message delivered by voice or by e-mail. If the intended recipient decides to have the e-mail message read to them, then either the text of the message is read by an operator or the text of the message is extracted by processor 75 and converted to machine synthesized sounds by text to speech engine 76.

Using the same approach, the message can be delivered in voice form to the intended recipient and left on the recipient's answering machine. Heretofore, technology did not exist to allow a deaf person to leave a voice message on another party's answering machine due to the fact that there is not enough time for a human operator to interface with the machine, relay its message to the deaf person, and receive the message from the deaf person for the machine all in time before the session in the answering machine shuts off. One advantage to using the system of FIG. 7 is that a TTY 70 can be used to leave an e-mail message for a party who does not have a personal computer. While a deaf person may use a TTY to leave the e-mail or voice message, he/she may use a personal computer in lieu of a TTY to leave the e-mail or voice message. Furthermore, in all the cases where a TTY is used to send and receive text, the deaf person can use specialized equipment provided with a camera, to sign into the camera, and then convert the signing into or from text either at the unit 710 or at the TRS 712.

Figure 8:
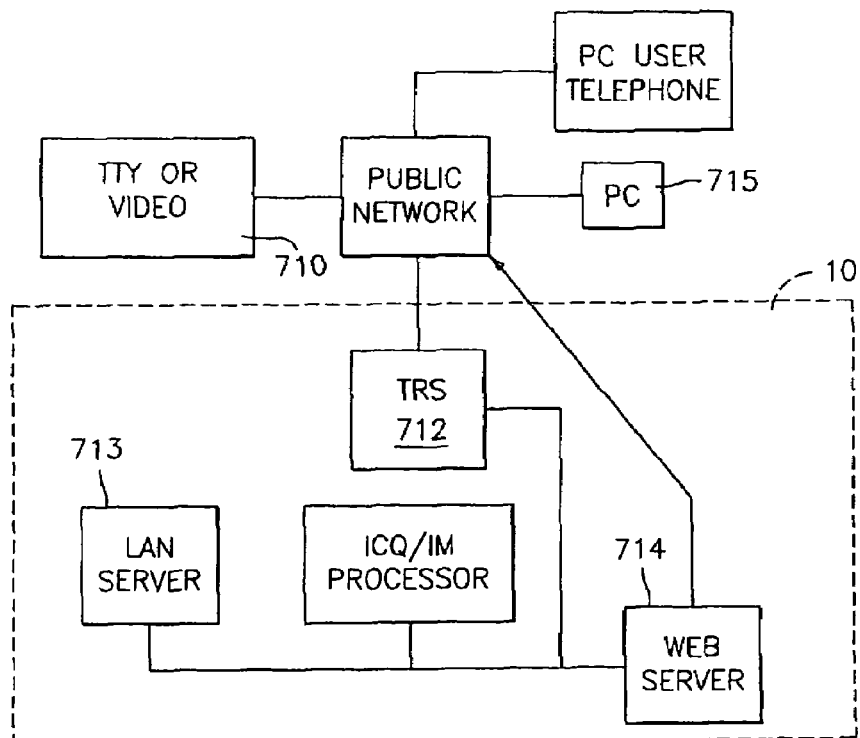
FIG. 8 illustrates a schematic representation of a system for allowing a hearing impaired or deaf person to initiate an IM or ICQ session.

The system of FIG. 8 enables an instant message (IM) or ICQ session between web users who are on line and TTY users. In this system, the telephone relay service 712, the LAN server 713 and the web server 714 act as a computer/server for a deaf person who does not have a personal computer. They determine initially whether the intended recipient is on-line or not. If it is determined that the intended recipient is not on-line, he/she can be summoned to an IM or ICQ session by the deaf person sending an email containing a session request using his/her TTY 710. The email, as before, includes a TNA address for the intended recipient. As before, the center 10 dials up the intended recipient and delivers a voice message calling him/her to an IM or ICQ session. Once contact has been established between the TTY user 710 and the intended recipient using personal computer 715, the deaf person types his/her message using his/her TTY 710. The message is then sent to the web server 714 via TRS 712 and LAN server 713. The web server 714 converts the message to the proper format for e-mail. The center 10 then transmits the converted message to the PC user. The PC user then replies and sends the reply to the web server 714. The web server 714 converts the e-mail into the proper format for receipt by a TTY. Once the conversion has taken place, it is transmitted to the TTY user via the TRS 712. The LAN server 713 enables supervision of the operation of the TRS 712 and the web server 714. As can be seen from the foregoing discussion, the system of FIG. 8 enables a deaf person to participate in an IM or ICQ session even though the deaf person does not have a personal computer.

Figure 9:
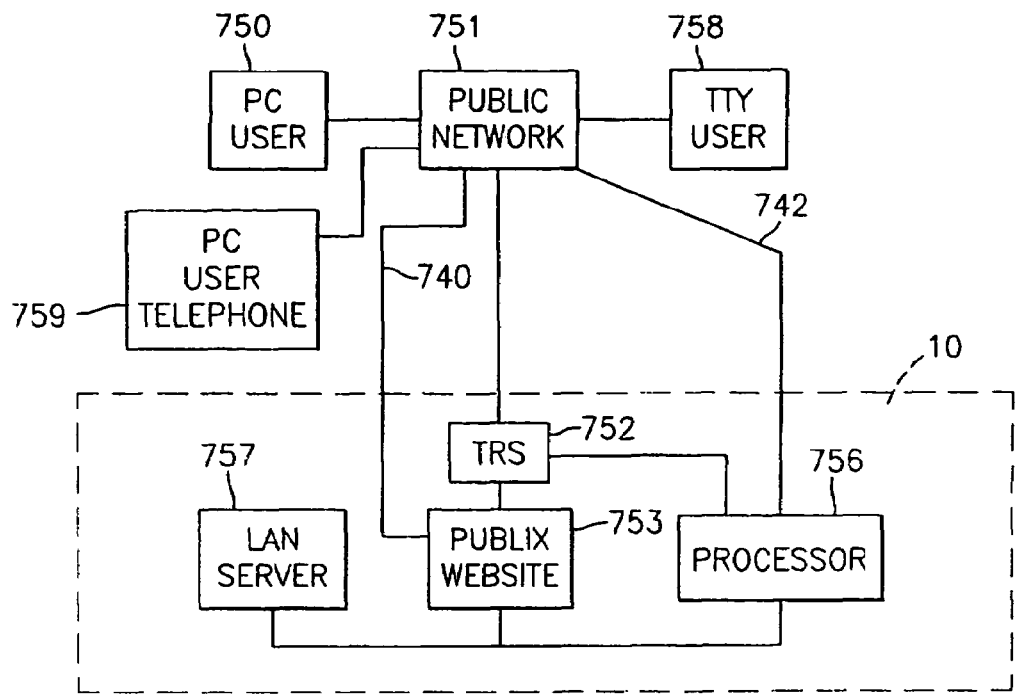
FIG. 9 illustrates a schematic representation of a system for issuing an IM or ICQ invitation when either party is not connected at the time.

Referring now to FIG. 9, a system is shown in which an individual at a personal computer 750 can issue an IM or ICQ request to a hearing impaired or deaf person who has a personal computer but who is not on line. As shown in this figure, the individual at personal computer 750 connects to the web site 753 associated with the communication center 10 via the public telephone network 751 and line 740. He/she then sends an email containing the TNA of the intended deaf or hearing person recipient. At the center 10, the email is routed to telephone relay service 752 and then to processor 756. As before, the center 10 has a LAN server 757 which supervises the network operation of processor 756. In processor 756, the email text is extracted and converted into a format compatible with a TTY if appropriate. The processor 756 dials out the TNA of the intended deaf person recipient and delivers the invitation to the IM or ICQ session to TTY 758. Alternatively, the processor 756 dials out the TNA of the intended hearing person recipient not then on line and delivers by telephone an invitation to the IM or ICQ session to telephone 759.

The system shown in FIG. 9 can also be used by a deaf person to issue an IM or ICQ invitation to a PC user. As before, the deaf person would dial through the public network and end at a dedicated line at the center 10 for handling TTY messages using his/her TTY 758. The deaf person would identify the intended recipient including his/her telephone number address and would identify himself/herself. The deaf person would issue the invitation in text form. The invitation communication is received by the TRS 752 which directs the communication to the processor 756. The processor 756 extracts the TNA of the intended recipient and dials out via line 742 and public network 751. Once the PC user answers his/her telephone 759, the invitation to the IM or ICQ session is delivered either by an operator at the center 10 when the TRS 752 is utilized or via machine synthesized sounds. The same method may be used by hearing individuals, with or without TTYs to invite others to an IM or ICQ session.

Figure 10:
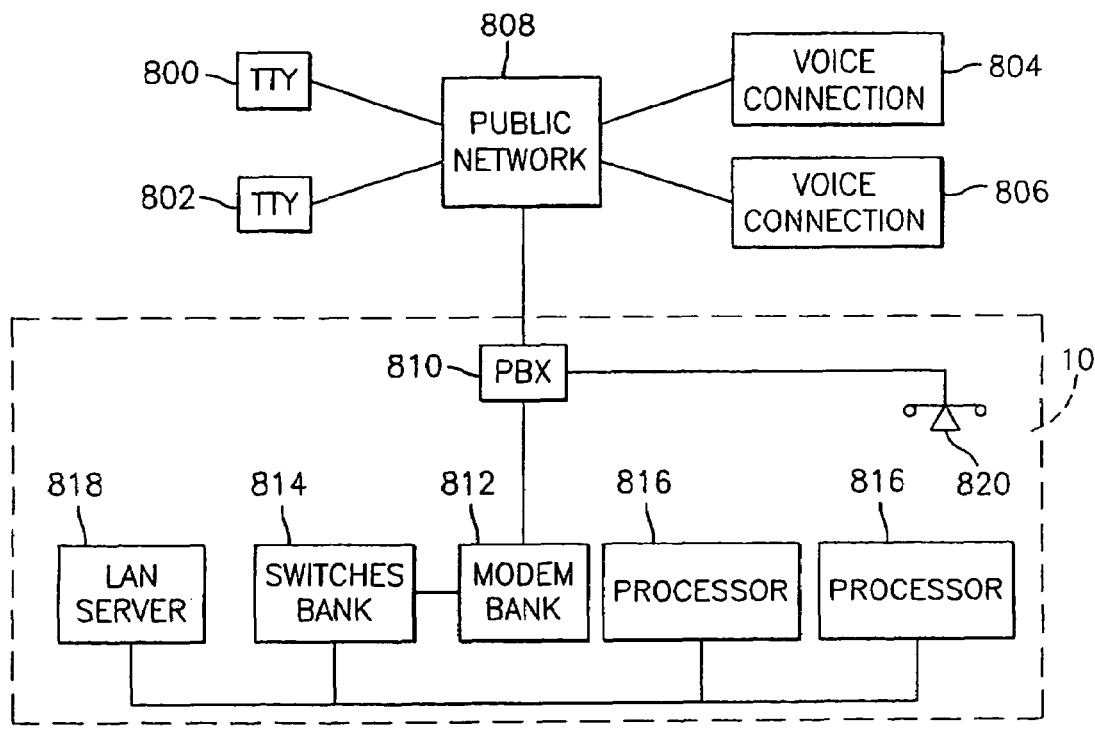
FIG. 10 illustrates a schematic representation of a system for having a conference call of TTY users.

Referring now to FIG. 10, a system is shown which enables a conference call of hearing impaired or deaf individuals and/or hearing individuals. Heretofore, there has been no effective system for conferencing hearing impaired or deaf individuals. As shown in this figure, a number of hearing impaired or deaf individuals and/or hearing individuals access the communication center 10 via any public telephone network(s) 808. The hearing impaired or deaf individuals utilize TTYs 800 and 802 to access the communication center 10 via telephone network(s) 808, while the hearing individuals utilize voice connection devices, such as telephones 804 and 806. Each communication from a hearing impaired or deaf individual or a hearing individual is forwarded to a standard PBX system 810 located in the center 10. In one embodiment, the PBX system 810 directs each communication from deaf and hard of hearing persons, and when applicable, also hearing persons to a bank 812 of modems. In an alternative embodiment, a hearing person can branch out of the PBX 810 to a telephone line 820. A bank of switches 814 is provided to connect each of the modems in the bank 812 to one of the connecting lines in the PBX 812 and to one of the processors 816. Processors 816 are programmed to receive each transmission from a conference participant and to convert the received transmissions into a form suitable for each conference participant. Voice communications received from voice participants are converted by operators or speech recognition routine at processors 816 to text and written to a pad whose contents are later transmitted to TTY users 800 and 802. The processors 816 also take the text transmissions from the TTY users 800 and 802 and converts them to voice communications which are later transmitted to the voice connections 804 and 806. The voice communications may be machine synthesized sounds or may be generated by operators at the computers 816 who are reading the text messages. Processors 816 may comprise any suitable computers known in the art and may be programmed to perform the foregoing functions using any suitable language. LAN server 818 is provided to supervise the operation of the processors 816, the bank 814 of switches, the bank 812 of modems and where applicable the PBX 810. The PBX 810, the modem bank 812, and the switch bank 814 may comprise any suitable systems known in the art.

Utilizing the system of FIG. 10, the text of each communication during the conference call can be displayed on the TTYs 800 and 802. Additionally, the processors 816 and/or their operators convert the text written by the deaf or hearing impaired individuals into machine voice communications which can be heard by the voice connection users 804 and 806. Heretofore, such a system was not available due to the limitations of TRS equipment and legal restrictions on calling assistants.

Figure 11:
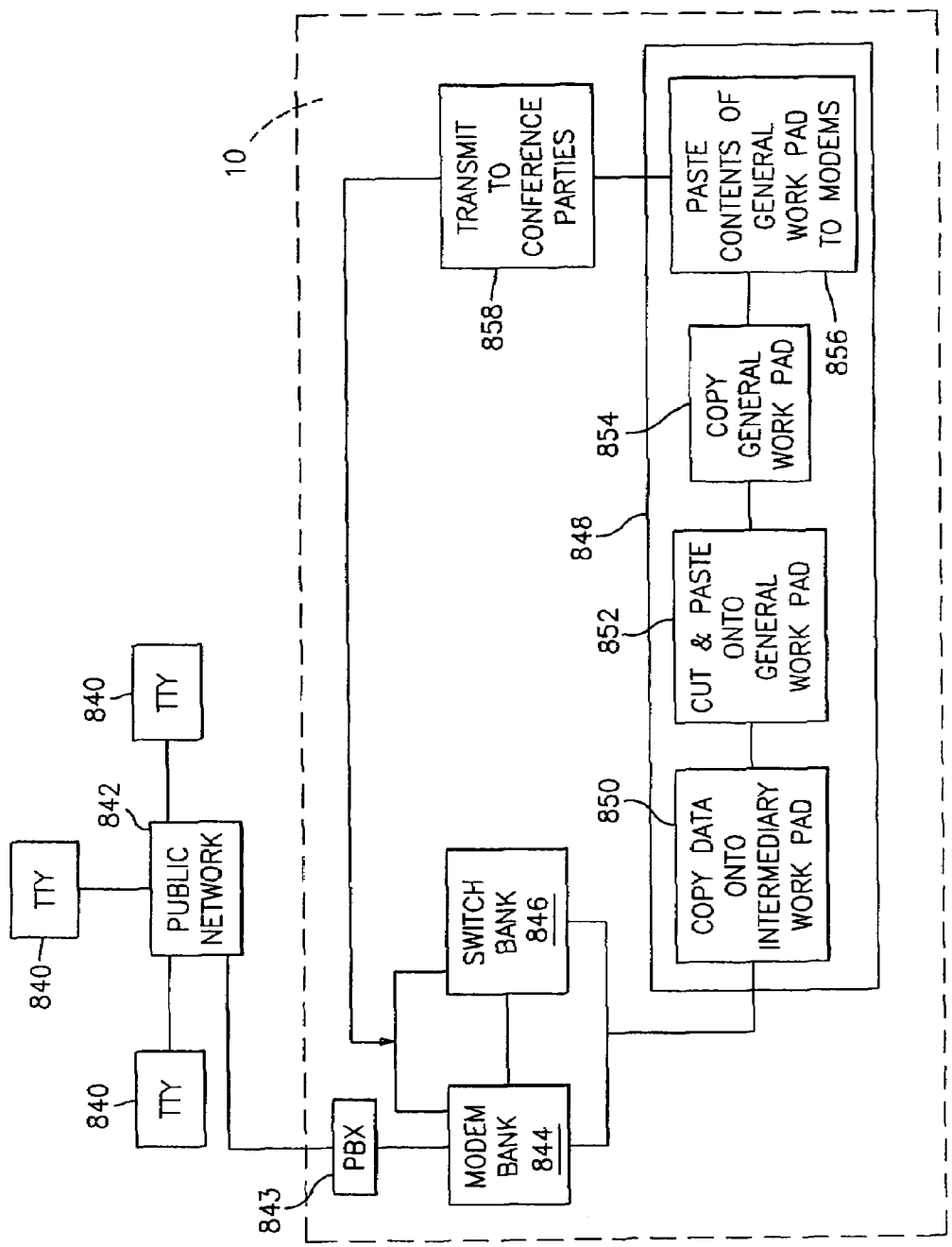
FIG. 11 illustrates a schematic representation of a system for sharing data amongst conferencing parties which include hearing impaired or deaf participants.

Referring now to FIG. 11, a system is shown for sharing data amongst conferencing hearing impaired or deaf individuals. As before, each hearing impaired or deaf individual utilizes a TTY 840 to communicate data to the other conference participants. The input from each conference participant may be transmitted to a communication center 10 via any public telephone network 842. Each data stream is received from the PBX 843 by an individual modem located in modem bank 844. The transmitted data is then forwarded to a processor or computer 848 located at the center 10. The processor 848 is programmed to have a number of modules 850, 852, 854 and 856 which respectively perform the following functions. In module 850, data from each TTY user is copied onto an intermediary work pad. In module 852, the multiple entries on the intermediary work pad are cut and pasted onto a general work pad. In module 856, the content of the general work pad, which contains the multiple entries from the individual modems, is copied so that each conference participant can receive the entire content of the general work pad. In module 856, the content of the general work pad is pasted to a number of individual modems in the modem bank 844 for transmission to each conferencing participant. Thereafter, in module 858, the content of each general work pad is transmitted to each conference participant. The bank 846 of switches insures that the communications are directed to the proper modems for transmission to the proper individuals. When the TTY users receive the contents of the general work pad, they receive it in a textual form that allows them to see all of the communications and data transmitted by the conferencing parties. They can also see it in sign language if desired and if they have the equipment for same. Heretofore, there did not exist any such system for allowing multiple hearing impaired or deaf individuals to share data in such a manner. The modem bank 844 and the switch bank 846 may comprise any suitable equipment known in the art. The processor 848 may comprise any suitable computer known in the art which has been programmed in any suitable computer language to carry out the identified functions. If desired, an operator at the processor 848 may perform the various functions outlined in modules 850, 852, 854, and 856.

Figure 12:
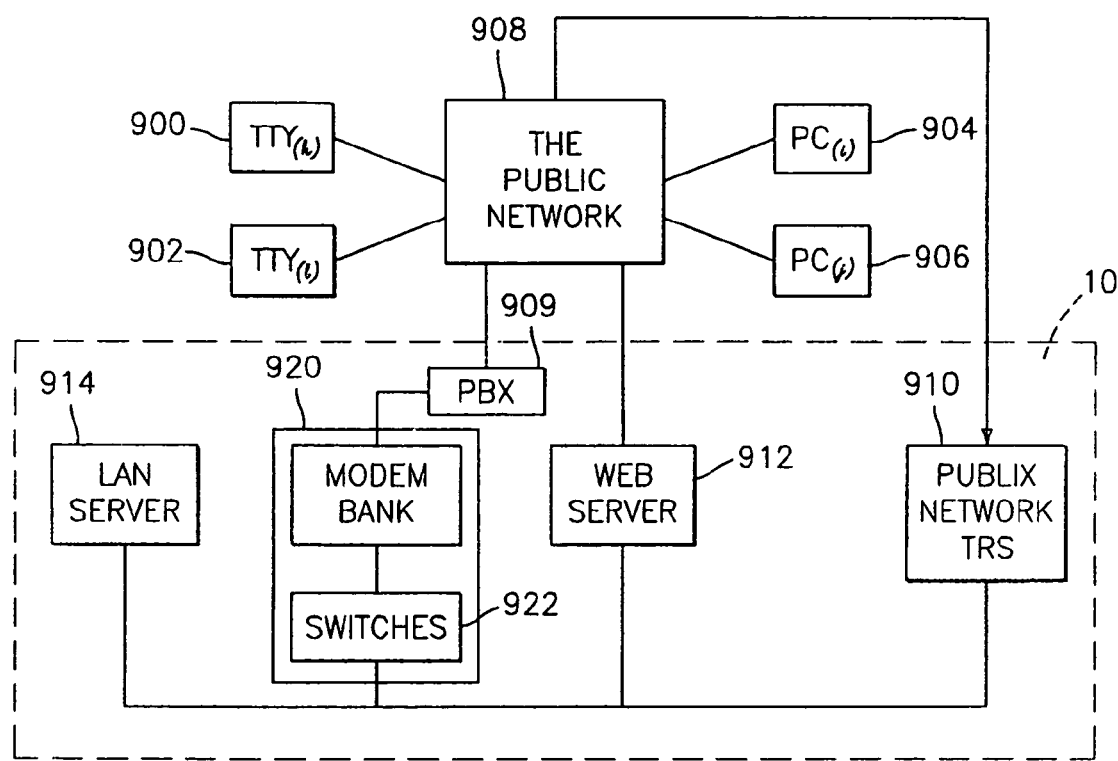
FIG. 12 illustrates a schematic representation of a system, for having a web IM or ICQ session involving TTY users.

Referring now to FIG. 12, a system is shown for hold a web IM or ICQ session with a number of conferencing parties some of whom are hearing impaired or deaf individuals using TTYs 900 and 902 and individuals, either hearing impaired, deaf, or hearing, using personal computers 904 and 906. Using this system, each individual, using his/her TTY or personal computer, establishes communication with the center 10 using any public telephone network 908 for a direct dial up or connecting through the network 908 to an ISP provider. In the communication center 10, a communication from the conference or session initiator is received. This communication contains the TNA for each conference call participant and information as to how each participant will participate, i.e. via TTY or personal computer, as well as the identification and telephone number address of the initiator. The center 10 then communicates with each of the participants through the network TRS 910 and/or the web server 912. A LAN server 914 enables the switch 920 to supervise the conference call to insure that communications are being received from and transmitted to each participant. The TRS 910 may comprise any suitable TRS known in the art. Similarly, the servers 912 and 914 and switches 920 may comprise any suitable processors or computers known in the art. Using the system of FIG. 12, text messages containing the communications from each of the participants will be displayed on the TTYs 900 and 902 and on the personal computers 914 and 916.

The TTY/email processes previously discussed can utilize the telephone relay service (TRS) at the communication center 10. The TRS can be utilized in a fully automated or semi-automated fashion, whereby a TRS operator assists the transaction. The TRS operator can be stationed within the center 10 or at a remote location. If stationed at a remote location, the TRS operator functions in a telecommuting fashion as a subordinate or pseudo-subordinate to the center 10. In such a system, the communication center 10 passes control to a telecommuting station where the remote (TRS) operator is located, while enabling operation under its own master control. The following description describes systems where an originating voice call terminates with a TTY or video receiving party and where an originating TTY or video call terminates with a voice receiving party. The systems to be described also extend to email communication with the facility and/or with standard email facilities.

Figure 13:
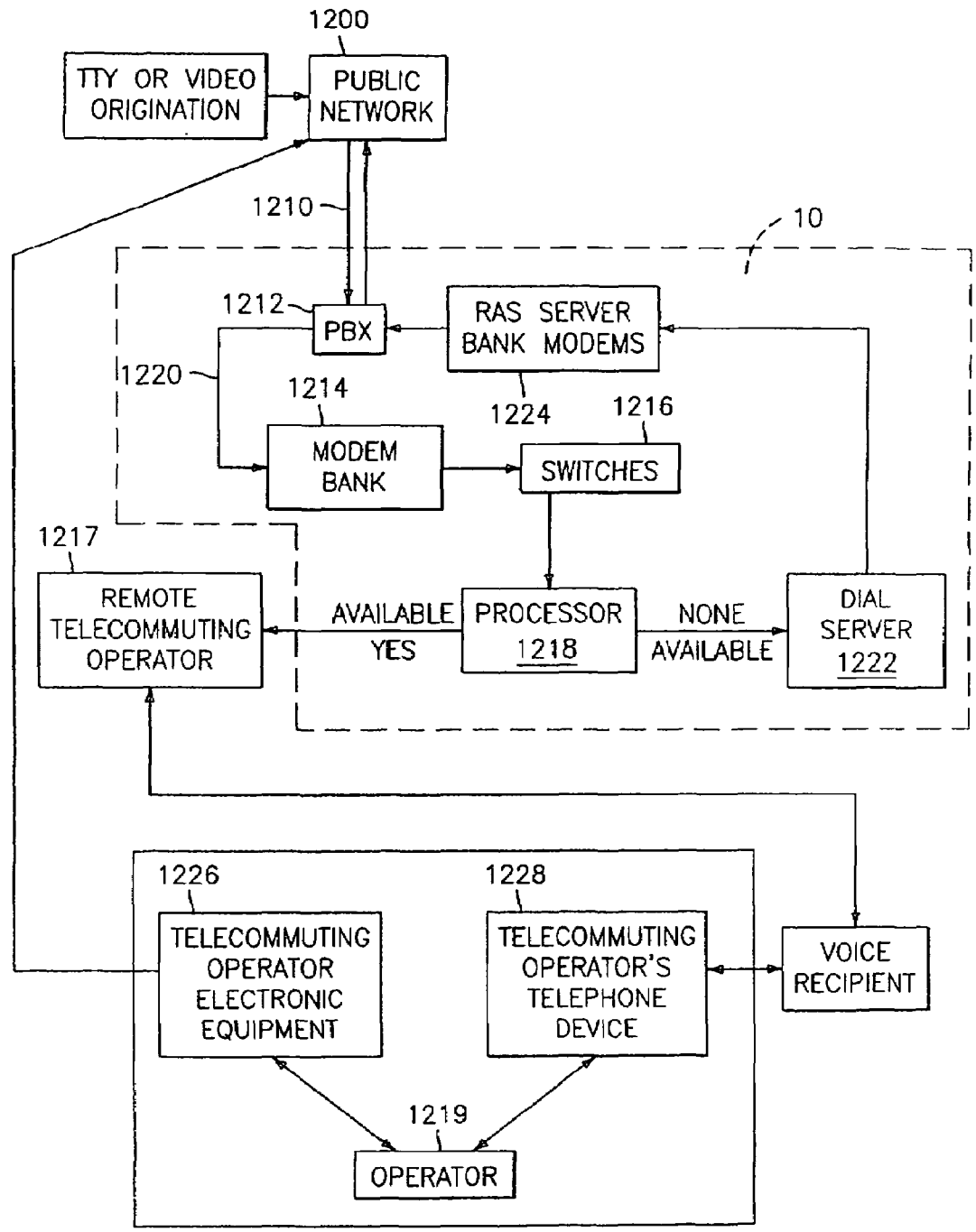
FIG. 13 illustrates a schematic representation of a system for a TTY user to communicate with a voice recipient via a telecommuting operator.

Referring now to FIG. 13, a system is shown for processing an originating TTY call destined to a voice recipient. In some instances, the deaf person can originate a video call whereby the deaf person signs into a camera included with his/her device. As shown in the figure, the call is originated by the TTY or video user and transmitted to the communication center 10 via any public telephone network 1200 and line 1210. The originating call is received by PBX 1212 in the center 10 and forwarded via line 1220 to a modem in bank 1214. A switch in bank 1216 is set and forwards the call to processor 1218. At any particular instance of time, a number of telecommuting operators are actively engaged in handling calls from TTY or video users and a number of operators are on line with the center 10 and standing by. Processor 1218 is programmed to determine how many telecommuting operators are engaged, and how many telecommuting operators are available or currently on-line. From that information, the processor 1218 determines whether it is necessary to activate another telecommuting operator to handle the incoming call from the TTY or video user. If the processor 1218 determines that another telecommuting operator must be activated, a dial server 1222 known as a remote access server (RAS) is initiated and dials out to establish the connection with the new telecommuting operator. The output of the server 1222 is transmitted to one of the modems in modem bank 1224. The modem dials out through the PBX 1212 and through the public network 1200 to establish the telephone link with the new telecommuting operator 1219. Through this mechanism the TTY or video call is forwarded to the new remote telecommuting operator 1219 who receives the forwarded TTY or video message on remote electronic equipment 1226. The equipment 1226 may be any suitable equipment for reading the message from the TTY originator in text form or signing form where applicable and preferably includes a modem. The remote telecommuting operator interfaces with the equipment 1226 and relays the message in voice form to the voice recipient using any suitable telephone device 1228 known in the art. The response by the voice recipient is transmitted to the TTY or video originator by reversing the foregoing communication flow. If the telecommuting operator is also a sign language interpreter then a camera is added to equipment 1226 which accepts sign forms from the interpreter as video input.

If the processor 1218 determines that there is no need to activate a new telecommuting operator, the message from the TTY or video user is forwarded to one of the telecommuting operators 1217 already on-line and standing by. The stand-by telecommuting operator also has electronic equipment 1226 including a camera where applicable and a telecommuting operator's telephone device 1228. The standby telecommuting operator then translates the message into voice and delivers the voice message to the voice recipient. Any response by the voice recipient is transmitted to the TTY or video originator by reversing the foregoing communication flow.

Figure 14:
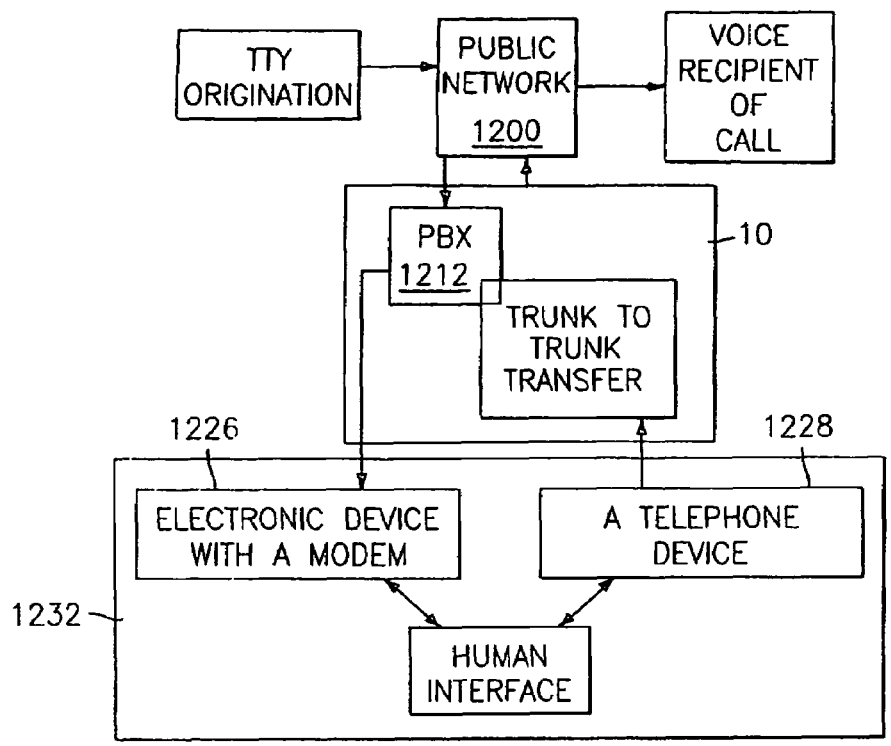
FIG. 14 illustrates an alternative embodiment of a system for a TTY user to communicate with a voice recipient via a telecommuting operator.

Another system for transmitting a TTY or video originated message to a voice recipient is shown in FIG. 14. In this variation, the TTY or video originated communication is forwarded to a communication center 10 having PBX 1212 via public telephone network 1200. The PBX 1212 transfers the call to remote telecommuting operator station 1232 where it is received by electronic equipment 1226 having a modem and/or a video reception portion. The remote telecommuting operator then interfaces with the equipment 1226, reads the TTY message or views the video, and speaks into a telephone device 1228. The operator's voice containing the message is transmitted to the intended voice recipient via a trunk to trunk transfer in the center 10, PBX 1212, and public network 1200. For the voice recipient to respond to the TTY user, the voice message travels in the reverse manner to the TTY user.

Figure 15:
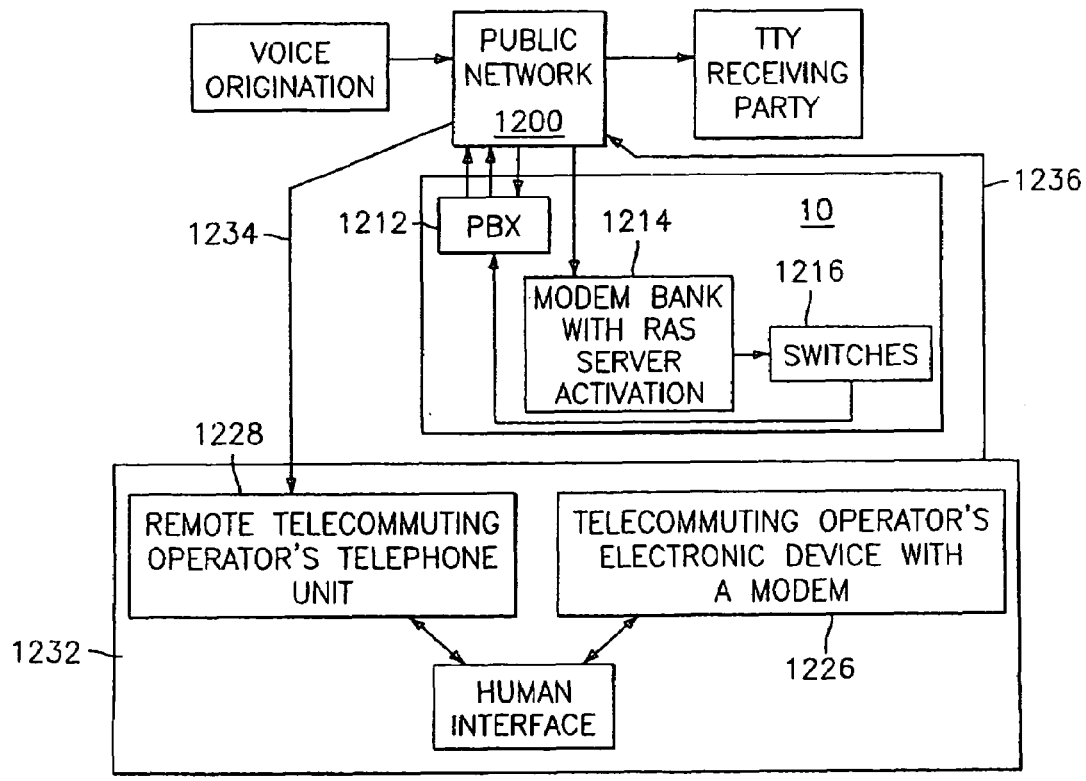
FIG. 15 illustrates a system for allowing a voice originator to communicate with a TTY user via a telecommuting operator.

Referring now to FIG. 15, a system is illustrated for conveying a voice message to a TTY or video receiving party. In this system, the voice originator dials up the communication center 10 using public telephone network 1200. The voice message generated by the originator is transmitted to PBX 1212 in the center 10. The PBX 1212 then transmits the voice message to the remote telecommuting operator station 1232 via public telephone network 1200 and line 1234. The voice message is received by the remote telecommuting operator's telephone device or unit 1228. The remote operator listens to the message and then inputs it into electronic equipment 1226. Such input can be text or alternatively singing to the camera portion of equipment 1226 where applicable. As before the electronic equipment 1226 has a TTY modem and/or a dial up standard modem. The converted message is then transmitted via line 1236 to the public telephone network 1200 and via the public telephone network 1200 to one of the modems in bank 1214. From the bank 1214, one or more switches in bank 1216 are thrown to forward the message to PBX 1212. PBX 1212 then transmits the text or video message to the TTY or video receiving party via the public telephone network 1200.

Figure 16:
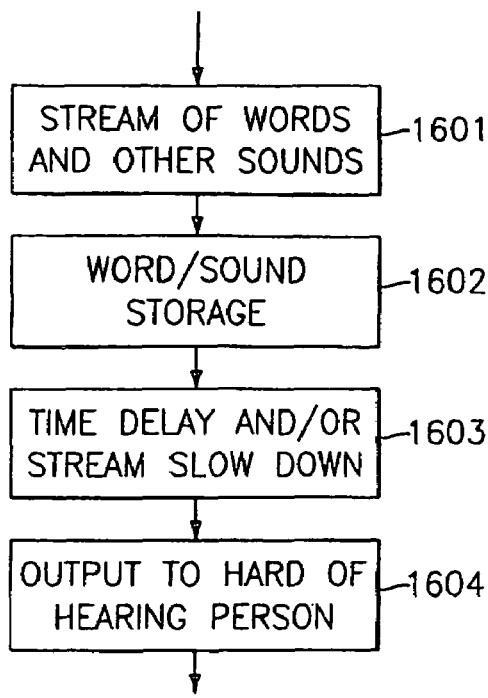
FIG. 16 illustrates a flow chart illustrating how speech or other sounds can be slowed down for a hard of hearing person.

There are instances where a hard of hearing person needs to understand what is being said to him/her by either another person or via a device with synthetic speech such as in the prompting by the FCT system. In particular, when such a person accesses the communication center 10, there is a need for the person to make certain inputs based on voice prompting. When a hard of hearing person has difficulty understanding the prompts, the help of a person, a device, or both, is required. Thus, in another aspect of the present invention, a mechanism is provided for a party to receive induced slowed-down stream of speech that enhances and/or enables comprehension of such speech by a hard of hearing person. The system of the present invention is designed to allow users who access the communication center 10 by computer, landline telephone, or wireless telephone to slow down the voice component of a voice prompting system. In this system, the hard of hearing person receives the speech output at a reduced speed. This is achieved by a programmed computer located at the center 10 which takes in a stream of speech from a person or another device and transforms it to a slower output with the ability to provide the same speaker's voice (as well as synthetic speech) transmitted back to the hard of hearing party. FIG. 16 is a flow chart illustrating what occurs within this programmed computer. In box 1601, a stream of words and other sounds are received by the computer. In box 1602, the stream of words and sounds are stored in any suitable storage device known in the art. Alternatively, the words and sounds may be stored with a hearing human operator located at the computer and who is reading a screen. In box 1603, a time delay is introduced between the words and other sounds. This can be done by slowing down the stream of words as a whole. In box 1604, the output of the computer is transmitted to the hard of hearing person. The output can be through a device or a speaking human operator.

This slow down procedure is introduced to a hard of hearing person through one of the voice prompts that the person receives when he establishes contact with the communication center 10. For example, the prompt may say "press 4 to slow down prompts and other voice communications". The center 10 is preferably designed so that the hard of hearing person can activate the speech slow down procedure at any time during a session.

Figure 17:
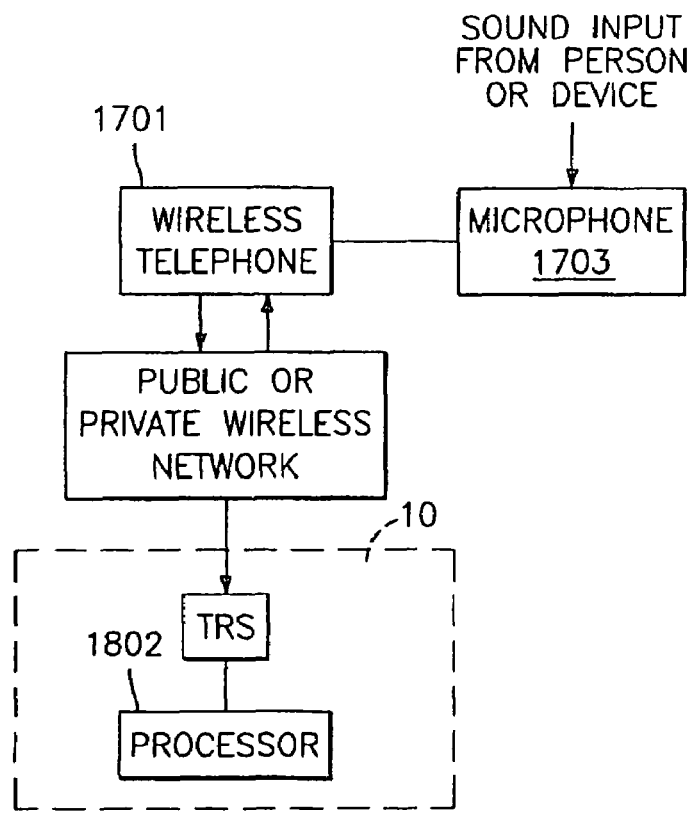
FIG. 17 illustrates a system for enabling a hard of hearing person to listen to a particular speech or sound.
Figure 18:
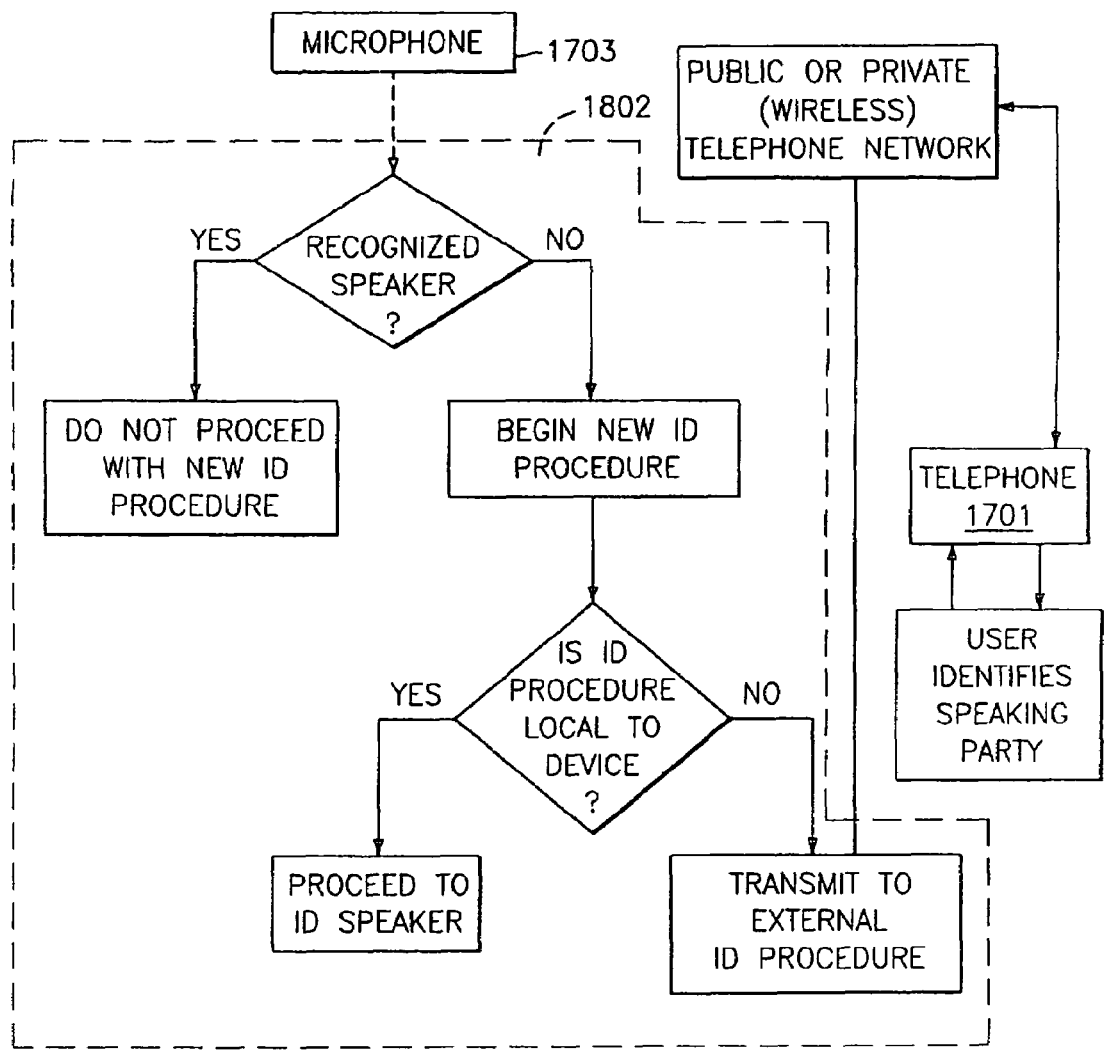
FIG. 18 is a flow chart of a method employed in the system of FIG. 17 to identify various speaking parties or sounds.
Figure 19:
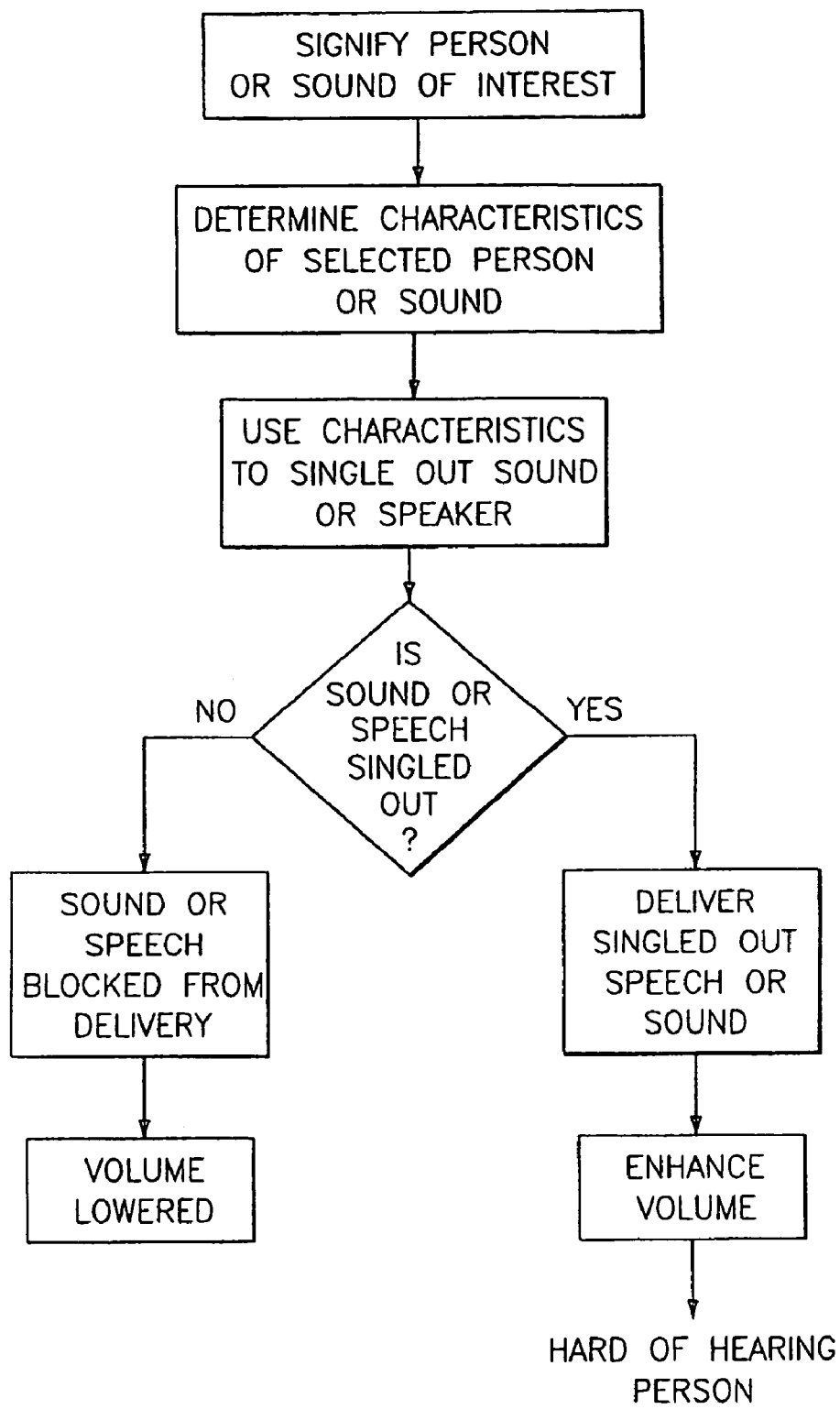
FIG. 19 is a flow chart of a method employed in the system of FIG. 17 to block out unwanted speech or sounds.

Sometimes slowing down a stream of speech is insufficient as white noise or other people who are talking in the vicinity make it difficult for a hard of hearing individual to transact with the communication center 10 or listen to an isolated voice or sound by choice. In yet another aspect of the present invention, the system allows the hard of hearing user to quickly calibrate to a particular sound or voice that will be recognized henceforth and any other sound or voice will either be reduced in volume, effectually making then non-existent for the hard of hearing person, or be eliminated from the environmental sounds and voices existing at that moment. FIGS. 17-19 illustrate a system for enabling a hard of hearing person to eliminate environmental sounds and concentrate on what is being said by one or more individuals.

Using the system of FIG. 17, a hard of hearing person in a public place, such as a restaurant uses a wireless telephone 1701 to establish communication with the communication center 10. A land line and standard telephone capabilities can be used for connectivity with equipment such as RJ-11, if available, as well as hook-up to a microphone. A microphone 1703 potentially with receiving and processing is connected to the telephone 1701 to receive and transmit the voices of the various people in the public place and to receive and transmit other external sounds. After a connection has been established, the hard of hearing person is prompted by the processor 1802 to indicate whether or not he/she is wearing a hearing aid device. If the answer is yes, the processor 1802 knows that communications to be sent to the hard of hearing person are to be sent to a hearing aid and thus triggers adjustments to the sound level accordingly. If the answer is no, the processor 1802 knows that communications are to be sent to some other speaker that is near, or in, the ear of the user and again sound level is adjusted accordingly.

Referring now to FIG. 18, the hard of hearing person and the other people with whom a conversation is being held speak into the microphone 1703 associated with telephone 1701. In the communication center 10, the speech is picked up and routed through a TRS to a processor unit 1802. The processor unit 1802 is used to determine whether an individual speaking at any moment is a recognized speaker whose voice pattern is in a data base associated with the processor unit 1802. If the processor determines that the speaker is in the data base, it identifies the speaker and does not proceed with a new ID procedure. If the processor 1802 determines that the speaker is not in the data base, it initiates a new identification procedure. First, it finds out if the ID procedure is local to the device. If it is, the speaker is identified. If it is not local, an external identification procedure is used where the hard of hearing person assigns or keys in a number, a letter, or initials to identify the speaking person, which number, letter, or initials are stored in the processor unit 1802. Individual attributes of the speaker, such as voice signature, are also stored in processor unit 1802 with reference to the speaker's ID.

Once all of the speakers, and their voice signatures, have been identified by the processor unit 1802, the hard of hearing person can identify which speaker he is interested in listening to. Referring now to FIG. 19, once the hard of hearing person has signified the person or even sound of interest, the characteristics of the person or the sound are identified by the processor unit 1802. The identified characteristics are used to single out the desired speaker or sound. Thereafter, any sound or speech which does not have the identified characteristics is blocked out by the processor unit 1802 and not delivered to the ear of the hard of hearing person. Alternatively, the volume of the sound or speech of no immediate interest to the hard of hearing may be lowered. If the sound or speech does have the identified characteristics, the sound or speech are delivered to the ear of the hard of hearing person via the telephone relay system and the wireless telephone. As before, the hard of hearing person can prompt the communication center 10 to enhance the volume of the singled out sound or speech. The delivered speech may be delivered by the telephone either to an ear piece in the user's ear or to the user's hearing aid. One of the advantages to this system is that a hard of hearing person does not have to invest in expensive equipment to be able to hold a conversation with another person in a noisy environment. The only piece of equipment required by the hard of hearing person in the system of the present invention is a telephone such as a wireless telephone and the microphone unit.

In yet another embodiment of the system of the present invention, a system similar to that of FIG. 8 may be used to allow a deaf person to participate in a chat room. To do this, the deaf person again uses the communication center 10 as a web access unit via server 714. Using his/her TTY 710, the deaf person identifies for the center 10 the chat room to which he/she would like to connect. The center 10 then uses its web server 714 to establish contact with the chat room. Communications from the chat room are transmitted to the web server 714 and put into a buffer. The communications are then converted to a format which can be read by a TTY or alternatively changed into a video stream of sign language and transferred at a slow speed for text and alternatively appropriate video speed to the deaf person's TTY or video 710. By transferring the communications at a slow speed, the deaf person is better able to read them all. To reduce the number of communications being transmitted, the deaf person using his/her TTY 710 can tell the web server 714 which individual(s) communications should be displayed. To participate in the chat room, the deaf person uses his/her TTY 710 to compose a message. The message is then delivered over the telephone connection between the TTY 710 and the center 10 to the TRS 712 and then to the web server 714. In the web server 714, the message is converted to a format compatible with the format being used for the chat room and then transmitted to the chat room. Alternatively, if the deaf person's unit 710 contains a camera and certain processing capabilities, such person can communicate with the chat room via sign language. In this embodiment, the text transmitted to the deaf person is converted to sign language he/she can view, while their signing to the camera is converted to text sent to the chat room. In this embodiment, the actual image of the deaf person is never transmitted and is deciphered to text which is sent out. Heretofore, deaf people could not participate in chat rooms using a TTY because telephone systems were not configured to do this.

It is apparent that there has been provided in accordance with the present invention a personal transaction system and method which fully satisfies the means, objects and advantages set forth hereinbefore. While the present invention has been described in the context of specific embodiments thereof, other variations, alternatives, and modifications will become apparent to one skilled in the art after reading the foregoing description. Therefore, it is intended to embrace all variations, alternatives, and modifications that fall within the broad scope of the appended claims.

What is claimed is:

1. A method for carrying out personal transactions comprising:
   providing a system having a center for performing personal transactions including financial transactions, e-mail transactions, and voice messaging transactions, which center includes a local area network, a voice response unit connected to said local area network, and a telephone communication system;
   initiating a registration procedure for a new user of said system, said initiating step comprising said new user communicating with said center via a first communication device;
   registering said user by prompting said user communicating with said center to provide personal information about said user;
   said registering step further comprising prompting said user to select an identification number for said user;
   said registering step further comprising prompting said user to create a PIN number by selecting a plurality of single digit numbers to act as a first segment of said PIN number and selecting at least one additional digital number to be incorporated into said PIN number to serve as a second security segment of said PIN number which generates an alarm signal if the user uses said PIN number with said at least one additional digital number;
   storing said personal information, said identification number, and said PIN number in said local area network;
   creating a money account and depositing money into said account;
   said depositing step comprises accessing said system via said first communication device, entering said identification number assigned to said user using said first communication device, entering said PIN number assigned to said user without entering said at least one additional digital number forming said security segment using said first communication device, and providing said money to be deposited to a first agent for said system;
   withdrawing money from said account and said withdrawing step comprising accessing said system using a second communication device, entering said user's identification number using said second communication device, entering said user's PIN number without entering said at least one security segment digital number using said second communication device, identifying the amount of money to be withdrawn using said second communication device, and receiving said money to be withdrawn from an agent for said system;
   said accessing step comprising accessing said system via an ATM; and
   inserting a credit card or an identification card into said ATM prior to entering said identification number.

2. The method according to claim 1, further comprising purchasing merchandise using said system.

3. The method according to claim 2, wherein said merchandise purchasing step comprises:
   accessing said system through a third communication device;
   entering said identification number and said PIN number without using said at least one security segment digit into said system using said third communication device;
   entering identification information about the entity selling said merchandise using said third communication device;
   storing said entered user identification and PIN numbers and entity identification information in a buffer in a computer connected to said third communication device; and
   connecting said third communication device to said system.

4. The method according to claim 3, wherein said merchandise purchasing step further comprises:
    downloading said information stored in said buffer to said system;
    opening a temporary file in said system containing said downloaded information;
    assigning a transaction identification number to said temporary file;
    transferring said transaction identification number to said buffer; and
    disconnecting said system from said computer.

5. The method according to claim 4, wherein said merchandise purchasing step further comprises:
    connecting said system to a computer utilized by said entity; and
    downloading said transaction identification number and said information in said temporary file to said entity computer.

6. The method according to claim 5, further comprising:
    said user accessing said entity computer;
    said user selecting merchandise to be purchased;
    said user downloading the transaction identification number stored in said buffer to said entity computer; and
    said entity computer verifying said downloaded transaction identification number with said system.

7. The method according to claim 6, further comprising debiting the user's account in the amount of the purchase.

8. The method according to claim 6, further comprising crediting an account maintained by said entity with an amount equal to the amount of said purchase.

9. The method according to claim 1, further comprising:
    said user accessing said system with a third communication device;
    identifying said user to said system using said third communication device;
    entering the name of the person to whom money is to be transferred and the amount to be transferred into the system using said third communication device;
    opening a temporary account containing the money to be transferred and assigning a transaction identification number to said temporary account; and
    withdrawing money from said user's account and storing said money in said temporary account until said person has transferred said money out of said temporary account to an account controlled by said person.

10. The method according to claim 9, further comprising closing said temporary account after said money has been transferred.

11. A method for carrying out personal transactions comprising:
    providing a system having a center for performing personal transactions including financial transactions, e-mail transactions, and voice messaging transactions, which center includes a local area network, a voice response unit connected to said local area network, and a telephone communication system;
    initiating a registration procedure for a new user of said system, said initiating step comprising said new user communicating with said center via a first communication device;
    registering said user by prompting said user communicating with said center to provide personal information about said user;
    said registering step further comprising prompting said user to select an identification number for said user;
    said registering step further comprising prompting said user to create a PIN number by selecting a plurality of single digit numbers to act as a first segment of said PIN number and selecting at least one additional digital number to be incorporated into said PIN number to serve as a second security segment of said PIN number which generates an alarm signal if the user uses said PIN number with said at least one additional digital number;
    storing said personal information, said identification number, and said PIN number in said local area network;
    said storing step comprising storing said identification number and PIN number assigned to said user in a customer database;
    monitoring said user;
    said monitoring step comprising having the user specify an activation time, at least one monitoring location and at least one assistance preference and storing said activation time, said at least one monitoring location, and said at least one assistance preference in said customer database; and
    said monitoring step further comprising calling said user at said activation time at said at least one monitoring location.

12. The method according to claim 11, further comprising:
    providing access to said system to individuals leaving an e-mail communication, a facsimile communication, or a page for said user.

13. The method according to claim 12, further comprising:
    identifying the user for which the e-mail communication, facsimile communication, or page has been left; and
    storing said e-mail communication, facsimile communication, or page message in said system.

14. The method according to claim 13, wherein said identifying step comprises looking up said user in said customer database and obtaining an address for said user.

15. The method according to claim 14, wherein said address obtaining step comprises obtaining an e-mail address for said user.

16. The method according to claim 14, wherein said address obtaining step comprises obtaining a telephone number for said user.

17. The method according to claim 13, further comprising notifying the user of the receipt of the e-mail communication, the facsimile communication, or the page message.

18. The method according to claim 17, further comprising storing said transmitted e-mail communication, facsimile communication, or page message in a message holding database; and providing said user access to said stored e-mail communication, facsimile communication or page message.

19. The method according to claim 18, wherein said access providing step comprises voice delivery of said e-mail communication, said facsimile communication or said page message.

20. The method according to claim 18, wherein said access providing step comprises delivering notification of said e-mail communication, said facsimile communication or said page message to said user's personal computer.

21. The method according to claim 18, wherein said access providing step comprises providing an electronic box for providing at least one of an indication of the presence of an e-mail message, the names of the individual transmitting the e-mail message, and the text of the e-mail message.

22. The method according to claim 11, further comprising initiating contact with said at least one assistance preference if said user does not enter said PIN number in response to said call.

23. The method according to claim 11, further comprising:
providing access to the system to a voice message sender; and
depositing a voice message from said sender to said user in said system.

24. The method according to claim 23, further comprising notifying said user of said deposited message.

25. The method according to claim 24, wherein said notifying step comprises triggering a notification signal when said user uses a particular credit/debit card.

26. The method according to claim 24, wherein said notifying step comprises contacting said user via telephone.

27. The method according to claim 24, further comprising enabling said user to retrieve said deposited message via telephone.

28. The method according to claim 21, wherein said identification number selection step comprises selecting said user's telephone number.

29. The method according to claim 21, wherein said identification number selection step comprises creating a ten digit number in the form of a telephone number.

30. The method according to claim 21, wherein said identification number selection step comprises said system selecting a ten digit identification number and assigning said ten digit identification number to said user.

31. The method according to claim 21, further comprising withdrawing money from an account and said withdrawing step comprising accessing said system using a second communication device, entering said user's identification number using said second communication device, entering said user's PIN number including said at least one security segment digital number using said second communication device to generate an alarm signal, identifying the amount of money to be withdrawn using said second communication device, and receiving said money to be withdrawn from an agent for said system.

* * * * *

UNITED STATES PATENT AND TRADEMARK OFFICE
CERTIFICATE OF CORRECTION

PATENT NO. : 7,287,009 B1  Page 1 of 1
APPLICATION NO. : 09/662451
DATED : October 23, 2007
INVENTOR(S) : Raanan Liebermann It is certified that error appears in the above-identified patent and that said Letters Patent is hereby corrected as shown below:

In column 16, line 67, delete "transit" and insert --transmit--.

In column 31, line 20, delete "21" and insert --11--.

In column 32, line 9, delete "21" and insert --11--.

Signed and Sealed this

Seventeenth Day of February, 2009

JOHN DOLL
*Acting Director of the United States Patent and Trademark Office*